US012793359B2

(12) United States Patent
Meouchy et al.

(10) Patent No.: US 12,793,359 B2
(45) **Date of Patent: *Nov. 10, 2026**

(54) SYSTEMS AND METHODS FOR COLLECTING, LOCATING AND VISUALIZING SENSOR SIGNALS IN EXTENDED REALITY

(71) Applicant: BADVR, INC., Marina Del Rey, CA (US)

(72) Inventors: Jad Meouchy, Venice, CA (US); Suzanne Borders, Los Angeles, CA (US)

(73) Assignee: BADVR, INC., Marina Del Rey, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 18/820,294

(22) Filed: Aug. 30, 2024

(65) Prior Publication Data

US 2025/0037394 A1 Jan. 30, 2025

Related U.S. Application Data

(63) Continuation of application No. 18/241,278, filed on Sep. 1, 2023, now Pat. No. 12,118,682, which is a continuation of application No. 17/608,483, filed as application No. PCT/US2020/032281 on May 10, 2020, now Pat. No. 11,783,554.

(60) Provisional application No. 62/846,439, filed on May 10, 2019.

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2200/04* (2013.01); *G06T 2219/2004* (2013.01)

(58) Field of Classification Search
None
See application file for complete search history.

(56) References Cited

U.S. PATENT DOCUMENTS 8,154,548 B2 * 4/2012 Kuroki .................... G06T 11/26 345/632

* cited by examiner

*Primary Examiner* — Robert J Craddock
(74) *Attorney, Agent, or Firm* — Zephyr Andrew

(57) ABSTRACT

Systems and methods for rendering one or more different types of datasets is described. An exemplar method includes: (i) obtaining a first type of dataset, wherein each first data value within the first type of dataset is associated with one or more three-dimensional coordinates, which define a location or region in real space; (ii) obtaining a second type of dataset, wherein each second data value within the second type of dataset is associated with one or more of the three-dimensional coordinates; (iii) spatializing the first type of dataset to create a first type of spatialized dataset; (iv) spatializing the second type of dataset to create a second type of spatialized dataset; (v) aligning the first type of spatialized dataset with the second type of spatialized dataset to create an enhanced three-dimensional spatialized environment; and (vi) rendering the enhanced three-dimensional spatialized environment on a display component.

20 Claims, 14 Drawing Sheets

SYSTEMS AND METHODS FOR COLLECTING, LOCATING AND VISUALIZING SENSOR SIGNALS IN EXTENDED REALITY

RELATED APPLICATION

This application is a continuation application of U.S. patent application Ser. No. 18/241,278 which was filed on Sep. 1, 2023 which was further a continuation of U.S. patent application Ser. No. 17/608,483, filed on Nov. 3, 2021, which in turn claims priority from an International Application No. PCT/US2020/032281 filed on May 10, 2020, which claims priority to provisional patent application No. 62/846,439, filed on May 10, 2019, which is incorporated herein by reference for all purpose.

FIELD

The present arrangements and teachings relate generally to novel systems and methods for collecting, locating and visualizing sensor signal measurements in an extended reality, which includes and spans from virtual reality to augmented reality. More particularly, the present arrangements and teachings relate to novel systems and methods, using among other techniques, complex data spatialization, for collecting, locating and visualizing sensor signal measurements in extended reality.

BACKGROUND

Virtual reality ("VR") and augmented reality ("AR") conventionally require a human interface device (commonly referred to as "the headset") to effectuate full features of the technology. Further, each of VR and AR span a range of reality, which is commonly called "Extended Reality" ("XR"). By way example, a user will often wear a headset to see into the XR world, which broadly describes a world that encompasses both VR, AR and all the intermediate realities.

Unfortunately, an XR system, which includes a headset, is typically limited and unable to process large amounts of complex data to convey information about the actual world (which is different from the virtual world) and therefore is not able to effectively inform about the actual world.

What is, therefore, needed are systems and methods relating to XR that process large amounts of complex data to inform on a real space in the actual world.

SUMMARY

The present systems and methods describe herein relate to XR and process large amounts of complex data to inform on a real space present in the actual world, as opposed to a virtual world.

In one aspect, the present teachings offer methods for rendering one more different types of attribute values datasets and an image dataset. One such exemplar method includes: (i) obtaining, using an optical sensor and a ground positioning component, three-dimensional pixelated data values or three-dimensional voxelated data values for one or more corresponding three-dimensional location coordinates; (ii) obtaining, using at least one non-optical sensor, one or more different types of attribute values for one or more of the corresponding three-dimensional location coordinates; (iii) spatializing, using a plurality of the corresponding three-dimensional location coordinates, the three-dimensional pixelated data values or the three-dimensional voxelated data values, to create a spatialized image dataset; (v) spatializing, using the plurality of the corresponding three-dimensional location coordinates and the attribute values of at least a particular type, to create a spatialized attribute value dataset of at least the particular type; (vi) aligning the image spatialized dataset with the spatialized attribute value dataset to create an enhanced three-dimensional spatialized environment; and (vii) rendering, using a rendering engine and on a display component, the enhanced three-dimensional spatialized environment.

In this exemplar method, each of the corresponding three-dimensional location coordinates are associated with at least one of the three-dimensional pixelated data values, at least one of the three-dimensional voxelated data values, or attribute values of at least one type.

In one preferred embodiment of the present teachings, the spatializing step to create the spatialized image dataset and/or the spatializing step to create the spatialized attribute value dataset includes: (1) spatially partitioning a space into plurality of subdivisions; and (2) integrating the subdivisions to create a spatialized model for the real space. In this preferred embodiment, the real space is defined using the corresponding three-dimensional location coordinates.

Further, the spatializing step to create the spatialized image dataset and/or the spatializing step to create the spatialized attribute value dataset may include using a microphone for collecting audio data or information present inside the real space. In this embodiment, the microphone may be operational, in conjunction with a filter, to increase a spatial resolution of the spatialized model for the real space.

The above-described exemplar method may further include storing one or more different types of the attribute values and their corresponding three-dimensional coordinates into a database. Further, the exemplar embodiment may use multiple non-optical sensors installed on different client devices or external controllers (which are operating in an "edge computing" scheme). Examples of client devices include a smartphone or a wearable. Such client devices collect intangible property data present inside a real space as its users traverse various locations in the real space. In one preferred embodiment of the exemplar method, a step of obtaining a plurality of attribute values at the plurality of the corresponding three-dimensional location coordinates is carried out, such that each of the corresponding three-dimensional location coordinates is associated with attribute values of at least one type.

In one implementation of the aligning step, a processor, based upon one or more common vertices present in the spatialized image dataset and in the spatialized attribute value dataset, aligns the two spatialized datasets. These common vertices are located inside a real space as well.

In a preferred embodiment, the rendering step of the present teachings includes: (1) representing the attribute values of a particular type, obtained at a location inside a real space, with virtual objects; (2) comparing the attribute values of the particular type to a threshold attribute value of the particular type; (3) assigning the virtual objects a first color, if the attribute values of the particular type is greater than the threshold attribute value of the particular type; (4) assigning the virtual objects a second color, if the attribute values of the particular type is less than the threshold attribute value of the particular type; and (5) rendering the virtual objects at objects rendering locations, in the enhanced three-dimensional spatialized environment. In this embodiment, the objects rendering locations correspond to locations of the corresponding three-dimensional location coordinates, which are associated with the attribute values of the particular type.

The present teachings also allow for estimation and/or prediction of attribute values when the measured attribute values, i.e., parameter values for an intangible property, are not available or not taken. To this end, the step of spatializing to create the spatialized attribute value dataset includes interpolating, using two or more of the attribute values of a particular type and two or more of their corresponding three-dimensional location coordinates, to compute an intermediate attribute value of the particular type. In this embodiment, a corresponding intermediate three-dimensional location coordinate, that is disposed between two or more of the corresponding three-dimensional location coordinates, is associated with the intermediate attribute value of the particular type. In this embodiment, the intermediate attribute value of the particular type is an estimation of the attribute value of the particular type and a rendering step may render an intermediate virtual object at an intermediate object location. In this rendering step, the intermediate virtual object is rendered, in the enhanced three-dimensional spatialized environment, and at a location that corresponds to a location of the corresponding intermediate three-dimensional location coordinate, which are associated with the intermediate attribute value of the particular type.

In connection with a prediction of the attribute values, the spatializing step, which creates the spatialized attribute value dataset, includes extrapolating, using two or more of the attribute values of a particular type and two or more of their corresponding three-dimensional location coordinates, to compute a predicted attribute value of the particular type. In this embodiment, a corresponding exterior three-dimensional location coordinate is disposed outside of the real space and positioned on a linear trajectory that intersects two or more of the corresponding three-dimensional location coordinates. Further, the corresponding exterior three-dimensional location coordinate is associated with the predicted attribute value of the particular type. For rendering the predicted attribute value of the particular type, the step of rendering, may further include rendering exterior virtual objects at exterior object locations, in the enhanced three-dimensional spatialized environment. The exterior object locations correspond to locations of the corresponding exterior three-dimensional location coordinate, which are associated with the predicted attribute values of the particular type.

In addition to interpolation and extrapolation, the present teachings offer other methods for determining attribute values where a measurement is not available or not taken. In certain embodiments, the spatializing step, which creates a spatialized attribute value dataset, includes creating an electronic representation of a wire mesh extending in a real space and that is defined using plurality of the corresponding three-dimensional location coordinates. This step may then advance to using the electronic representation of the wire mesh to compute an unknown attribute value of at least particular type at a defined location in the real space.

In the exemplar embodiment described above, the rendering step includes rendering a virtual object at each of object rendering locations, in the enhanced three-dimensional spatialized environment. The object rendering locations correspond to locations of the corresponding three-dimensional location coordinates, which are associated with the attribute values of a particular type. The above-described exemplar method may further include a detecting step that detects an interaction of a user with one or more of the virtual objects. This detecting step is carried out after the rendering step described in the exemplar method.

If the detecting step, detects an interaction of the user with one or more of the virtual objects, then a visual feedback element is rendered. This visual feedback conveys the interaction of the user with one or more of the virtual objects and/or conveys a magnitude and/or a direction of the attribute values of a particular type,p which are associated with one or more of the virtual objects.

The construction and method of operation of the invention, however, together with additional objects and advantages thereof, will be best understood from the following descriptions of specific embodiments when read in connection with the accompanying figures.

BRIEF DESCRIPTION

DETAILED DESCRIPTION

Figure 1:
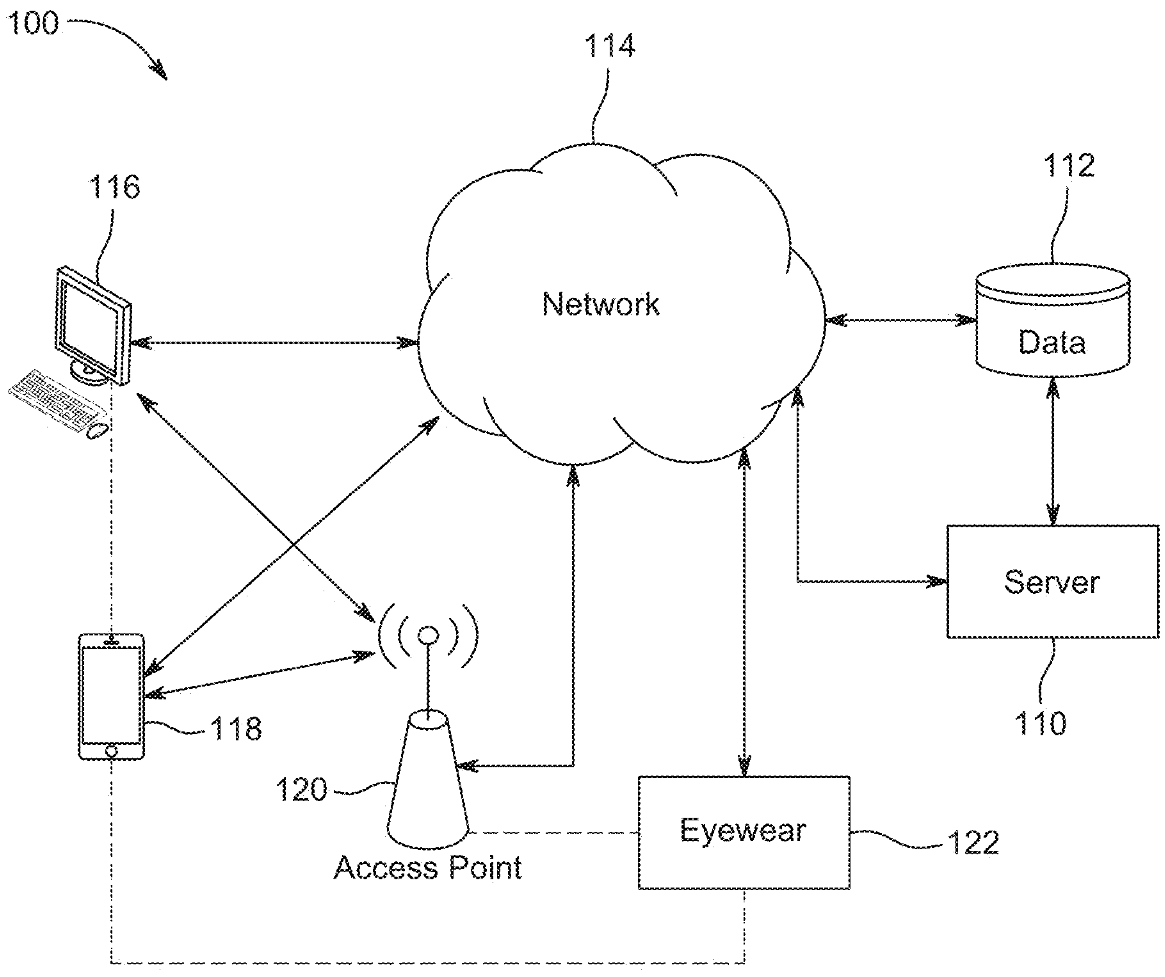
FIG. 1 shows a block diagram of an XR system, according to one embodiment of the present arrangements and that includes, among other things, an eyewear and a processor to create XR.

In the following description numerous specific details are set forth in order to provide a thorough understanding of the present invention. It will be apparent, however, to one skilled in the art that the present invention may be practiced without limitation to some or all of these specific details. In other instances, well known process steps have not been described in detail in order to not unnecessarily obscure the invention.

The present systems and methods described herein may be deployed using a processor-based eyewear (e.g., headset or eyeglasses). In one embodiment of the present arrangement, however, a smartphone, in the absence of eyewear, renders one or more different types of datasets. As a result, use of eyewear is not necessary, but represents a preferred embodiment of the present arrangements.

The present arrangements provide systems of many different configurations for rendering extended realities ("XRs") of the present teachings. In one XR of the present teachings, two or more different types of datasets are rendered. In one such XR, one dataset may include an image data of a real space and another dataset may include data conveying a magnitude of an intangible property inside the real space. In another XR of the present teachings, an image dataset, which is an electronic representation of the space being perceived by the user, is spatialized and rendered. According to the present teachings, image datasets are not the only type of datasets that may be spatialized before rendering. In fact, one or more different types of attribute value datasets present in the real space may be spatialized before rendering.

In certain embodiments, the processor-based headset of the present arrangements will generally comprise a processor, which includes one or more memory devices operable to provide machine-readable instructions to the processors and to store data. In some of these embodiments, the processor-based headset is communicatively coupled to external devices that include one or more sensors for collecting persisting data. In other embodiments, all the necessary sensors are integrated into the processor-based headset.

In one preferred embodiment of the present arrangements, the processor-based headsets may include data acquired from remote servers. The processor may also be coupled to various input/output ("I/O") devices for receiving input from a user or another system and for providing an output to a user or another system. These I/O devices may include human interaction devices such as keyboards, touch screens, displays and terminals as well as remote connected computer systems, modems, radio transmitters and handheld personal communication devices such as cellular phones, smartphones, and digital assistants.

The processors of the present arrangements may also include mass storage devices that are associated with disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The present teachings and arrangements contemplate that the methods disclosed herein will also operate over a network such as the Internet, and may be effectuated using combinations of several processing devices, memories and I/O. Moreover, any device or system that operates to effectuate one or more steps, according to the present teachings, may be considered a "server," as this term is used in this specification, if the device or system operates to communicate all or a portion of the programmable instructions to another device, such as an eyewear or a smartphone.

In certain aspects of the embodiments that employ multiple devices, i.e., multiple eyewear devices, servers and data storage devices may operate in a cloud or may operate, in the absence of the Internet, to draw from multiple data sources. In these configurations, multiple devices may collectively operate as part of a peer-to-peer ad-hoc network. These configurations of the present arrangement would implement "edge computing," which is a distributed computing paradigm that brings computation and data storage closer to the location where it is needed, to improve response times and save bandwidth. In some of these aspects of the present arrangement, the eyewear would communicate with each other without the Internet, where one of them would act as a sort of communication server, but without any other connectivity.

The processors of the present system may be, partially or entirely, integrated into a wireless device such as a smartphone, an eyewear, a personal digital assistant (PDA), a laptop, a notebook and a tablet computing device that operates through a wireless network. Alternatively, the entire processing system may be self-contained on a single device in certain embodiments of the present arrangements.

The processors of the present systems may be coupled to a three-dimensional ("3D") controller for interactivity. A 3D controller takes human input and provides signals directing the processing system to alter a display of information. Conventional 3D controllers may be used to virtually move through an image displayed on a screen. Described below are certain exemplar embodiments of the processor-based headset of the present arrangements.

FIG. 1 shows a functional block diagram of an Extended Reality ("XR") system 100, according to one embodiment of the present arrangements. XR System 100 includes a server 110 that is coupled to one or more databases 112 and to a network 114 (e.g., the Internet). Network 114 may include routers, hubs and other equipment to effectuate communications between all associated devices. A user may choose to access server 110 by a computer 116 that is communicatively coupled to network 114. Computer 116 includes, among other things, a sound capture device such as a microphone (not shown to simplify illustration). Alternatively, the user may access server 110 through network 114 by using a smart device 118, such as a smartphone or PDA. Smartphone 118 may connect to server 110 through an access point 120 coupled to network 114. Smartphone 118, like computer 116, may include a sound capture device such as a microphone.

XR system 100 may include one or more user devices (e.g., XR headset) 122 coupled to network 114 directly, through the access point 120, or directly to remote processing devices. By way of example, an XR headset or game controller may be coupled to a processing device for getting user input. This coupling may be wireless using technologies such as Bluetooth, i.e., a wireless technology standard used for exchanging data between fixed and mobile devices over short distances, using short-wavelength UHF radio waves in the industrial, scientific and medical radio bands, from 2.402 GHz to 2.480 GHz, and building personal area networks (PANs). Regardless of how the headset is coupled to one or more different types of devices, a user may use user device 122 to perceive an environment in which she or he is present.

Conventionally, client device/server processing operates by dividing the processing between two devices such as a server and a smart device, such as a smartphone or other computing device. The workload is divided between the servers and the client devices (e.g., smartphones or wearables, such as an eyewear), according to a predetermined specification. By way of example, in a "light client" mode of operation, the server does most of the data processing and the client device does a minimal amount of processing, often merely displaying and/or rendering the result of processing performed on a server (e.g., Server 110).

According to the current disclosure, client device/server applications are structured so that the server provides programmable instructions to one or more different types of client devices and the client devices execute those programmable instructions. The interaction between the server and the client device indicates which instructions are transmitted and executed. In addition, the client device may, at times, provide for programmable instructions to the server, which in turn executes them. Several forms of programmable instructions are conventionally known including applets and are written in a variety of languages including Java and JavaScript.

Client device applications implemented on the client device, and/or server applications implemented on the server, provide for software as a service (SaaS) applications where the server provides software to the client device on an as needed basis.

In addition to the transmission of instructions, client device/server applications also include transmission of data between the client device and server. Often this entails data stored on the client device to be transmitted to the server for processing. The resulting data is then transmitted back to the client device for display or further processing.

The present teachings recognize that client devices (e.g., computer 116, smartphone 118 or eyewear 122) may be communicably coupled to a variety of other devices and systems such that the client receives data directly and operates on that data before transmitting it to other devices or servers. Thus, data to the client device may come from input data from a user, from a memory on the device, from an external memory device coupled to the device, from a radio receiver coupled to the device or from a transducer or sensor coupled to the device. In the present arrangements, the sensors may be an optical sensors and/or non-optical sensors. The radio may be part of a wireless communications system such as a "Wi Fi" or Bluetooth receiver. "Wi Fi," as this term is used in this specification, refers to a family of wireless networking technologies, based on the IEEE 802.11 family of standards, which are commonly used for local area networking of devices and the Internet access.

Sensors that are communicatively coupled to any one of the eyewear, another client device (e.g., a smartphone or a personal computer) or a server may be any of a number of devices or instruments, in one embodiment, non-optical sensors of the present arrangements detect a magnitude of an intangible property in the real space.

A client-server system, in which a client device and a server are communicatively coupled to achieve a desired result, may rely on "engines" which include processor-readable instructions (or code) to effectuate different elements of a design. Each engine may be responsible for different operations and may reside, in whole or in part, on a client device, a server or another device. As disclosed herein a rendering engine, a display engine, a data engine, an execution engine, a user interface (UI) engine may be employed. These engines may seek and gather information about events from remote data sources. Further, these engines may facilitate the rendering, displaying and/or causing to display of "processed information," which is generated by a processor.

The described methods and systems, of the present teachings, may be effectuated using conventional programming tools including database tools for collecting, storing and searching through structured data. Moreover, web-based or other programming techniques may be employed to collect information and cause to display, display or render results. Accordingly, software engines may be created to effectuate these methods and techniques, either in whole or part, depending on the desired embodiment described herein.

Figure 2:
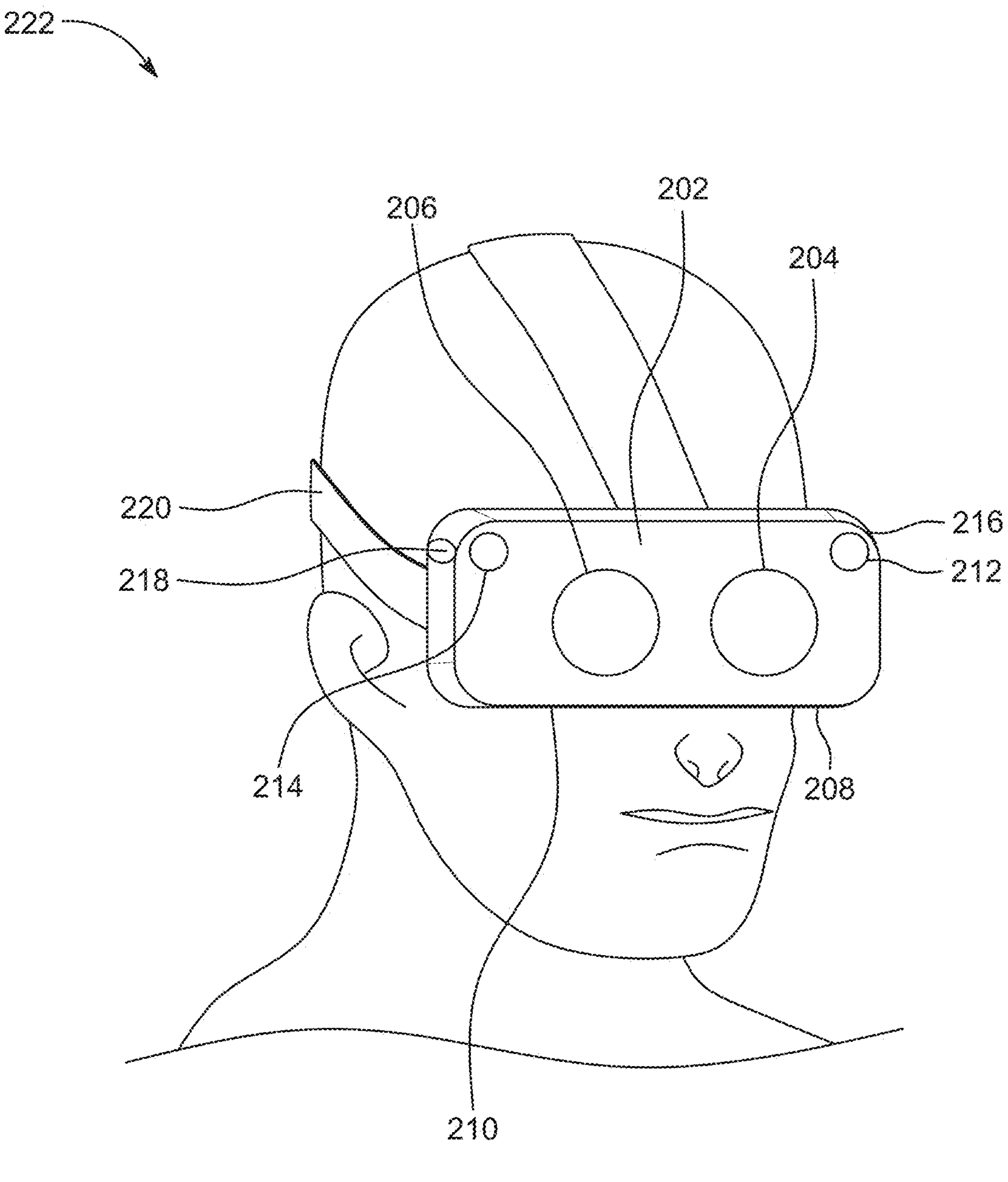
FIG. 2 shows an eyewear, according to one embodiment of the present arrangements and that includes imaging devices and displays to view XR renderings of the present teachings.

FIG. 2 shows an exemplar eyewear (e.g., an XR headset) 222 of the present arrangements that fits around a user's eyes using a strap 220. In one embodiment, eyewear 122 of FIG. 1 is eyewear 222, which includes a frame 202 that is equipped with three imaging devices for the user's right side, i.e., 210, 214, 218, three imaging devices for the user's left side, i.e., 208, 212, 216, and two displays, i.e., 206 and 204, one for each eye.

In the arrangement of eyewear 222, left look-side imaging device 216 provides an image of the space that lies to the left side of the user, left look-front imaging device 212 provides an image of the space that lies in front, but to the left, of the user, and left look-down imaging device 208 provides an image of the space that lies below, but to the left, of the user. Similarly, with respect to the right side of the user, right look-side imaging device 218 provides an image of the space that lies to the right side of the user, right look-front imaging device 214 provides an image of the space that lies in front, but to the right, of the user, and right look-down imaging device 210 provides an image of the space that lies below, but to the right, of the user. As a result, these six imaging devices (i.e., cameras) capture an image of the space surrounding the user. Further, eyewear 222 includes a left eye display 204 and a right eye display 206 for rendering and/or displaying information for the user's left eye and right eye, respectively.

Although eyewear 222 is not shown (to simplify illustration and facilitate discussion) to include a non-imaging optical sensor, frame 202, in certain embodiments of the present arrangements, incorporates one or more non-optical sensors to provide non-imaging type of information regarding a real space of interest to the user. In preferred configurations of these embodiments, frame 202 houses a processor, which serves as a processing subsystem for processing both imaging and non-imaging information obtained using above-described optical sensor (including an imaging device) and non-optical sensor, respectively. In this embodiment, the processor of eyewear 222, not only generates "processed information" from the imaging and non-imaging information, but also effectively renders or displays and/or causes to display the "processed information" on left eye display 204 and right eye display 206.

Figure 3:
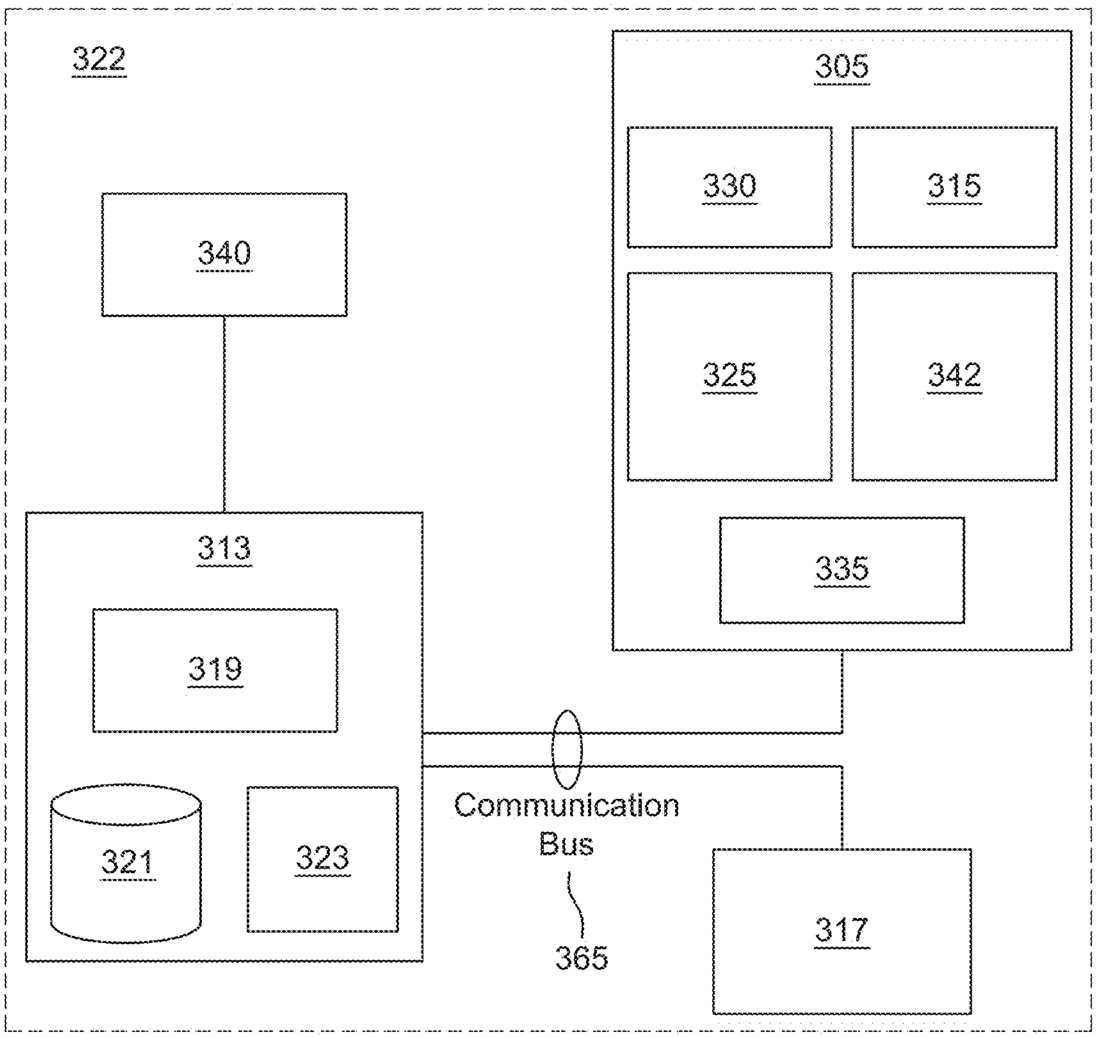
FIG. 3 shows a block diagram of a processor-based eyewear, according to one embodiment of the present arrangements and that integrates a non-optical sensor, a processor, and an optical sensor, which includes the imaging devices of FIG. 2, such that these components function in a cooperative manner to perform certain methods of the present teachings described herein.

FIG. 3 shows a processor-based eyewear 322, according to one embodiment of the present arrangement and that includes a processing subsystem 313 that is configured to receive and process both imaging information obtained from an optical sensor device 305 and non-imaging device information or, in the alternative, non-imaging information, obtained from a non-optical sensor device 340. Such processing of information allows processing subsystem 313 to produce the "processed information" that is rendered and/or displayed, or caused to display, on an I/O interface 317 (e.g., left eye display 204 and right eye display 206 of FIG. 2). A network (e.g., the Internet), preferably, serves as a communication bus 365 to effectively communicatively couple processing subsystem 313, optical sensor device 305, non-optical sensor device 340 and I/O interface 317 so that the requisite information from the sensors is received, processed and then displayed and/or rendered on an I/O interface 317.

Non-optical sensor 340 is a sensor that is configured to measure a magnitude of one or more intangible properties present within a real space. In preferred embodiments of the present arrangements, non-optical sensor 340 is at least one sensor chosen from a group comprising sensor measuring throughput of a connectivity signal, sensor measuring latency of a connectivity signal, sensor measuring interference of a connectivity signal, sensor measuring volatility of a connectivity signal, sensor measuring stability of a connectivity signal, radio frequency ("RF") power output sensor, electric and magnetic fields ("EMF") sensor, atmospheric pressure sensor, geomagnetic sensor, hall effect sensor, ambient light level sensor, gas levels sensor, smoke sensor, sound pressure sensor, audio harmonics sensor, humidity sensor, carbon dioxide emission sensor, and temperature sensor. In one embodiment of the present arrangements, a sensor measuring a throughput of a connectivity signal measures a bandwidth of the connectivity signal and sensor measuring volatility of a connectivity signal measures the stability of the connectivity signal.

Optical sensor device 305 of FIG. 3 includes an optical assembly 330, an imaging device 315, an electronic display 325, an inertial measurement unit ("IMU") 342, one or more position sensors 335. Processing subsystem includes an image processing engine 319, an application store 321 and a tracking module 323.

In optical sensor device 305, one or more imaging devices 315 (e.g., imaging devices 208, 210, 212, 214, 216, 218 of FIG. 2) capture data characterizing a scene or a local area of interest, typically the space surrounding a user. In accordance with one present arrangement, imaging device 315 includes a traditional image sensor (e.g., camera), such that the signals captured by imaging device 315 include only a two-dimensional image data (e.g., data having no depth information). In another present arrangement, imaging device 315 includes a projector device that allows imaging device 315 to operate as a depth imaging system that computes depth information for a scene using collected data (e.g., based on captured light according to one or more computer-vision schemes or algorithms, by processing a portion of a structured light pattern, by time-of-flight ("ToF") imaging, or by simultaneous localization and mapping ("SLAM")). In an alternative present arrangement, imaging device 315 transmits corresponding data to another device, such as the processing subsystem 313, which determines or generates the depth information using the data from the imaging device 315.

In yet another present arrangement, imaging device 315 is a hyperspectral imaging device that represents a scene as multiple spectra of light. In this arrangement, different features or objects within a scene are visualized using light of specific wavelengths, and, therefore, may be better understood, analyzed, and/or visually or quantitatively described.

In preferred embodiments of the present arrangements, electronic display 325 displays two-dimensional or three-dimensional images based upon the type of data received from processing subsystem 313. In certain of these arrangements, optical assembly 330 may magnify image light received from electronic display 325, correct optical errors associated with the image light, and/or present the corrected image light to a user of optical sensor device 305.

In one embodiment of the present arrangements, IMU 342 represents an electronic device that generates fast calibration data based on measurement signals received from one or more of the position sensors 335. To this end, one or more position sensors 335 are configured to generate once or more measurement signals in response to motion of eyewear 322. If one or more of position sensors 335 provide information on locations where measurements are obtained, then in this specification, they are sometimes (e.g., in connection with FIGS. 10, 11 and 13) referred to as a "ground position component."

Examples of different types of position sensors 335 include accelerometers, gyroscopes, magnetometers, another suitable type of sensor that detects motion, or a type of sensor used for error correction of IMU 342. Position sensors 335 may be located external to IMU 342, internal to the IMU 342, or some portions may be located internal to and other portions may be located external to IMU 342. Regardless of their location, position sensors 335 may detect one or more reference points, which are used for tracking a position of eyewear 322 in a local area by using, for example, tracking module 323 of processing subsystem 313.

In processor subsystem 313, image processing engine 319 may generate, based on information received from optical sensor device 305 or from components thereof (e.g., imaging device 315), a three-dimensional depth mapping or multiple three-dimensional depth mappings of the space (e.g., the "scene" or the "local area" of interest) surrounding a portion or all of optical sensor device 305. In certain embodiments, image processing engine 319 of the present arrangements may generate depth information for the three-dimensional mapping of the scene based on two-dimensional information or three-dimensional information received from imaging device 315 that is relevant for techniques used in computing depth maps. The depth maps may include depth dimension values for each of the pixels in the depth map, which may represent multiple different portions of a scene.

Continuing with processor subsystem 313, application store 321 may store one or more software applications or programmable instruction sets for execution by processing subsystem 313 or by the optical sensor device 305. A software application may, in some examples, represent a group of programmable instructions that, when executed by a processor (e.g., processing subsystem 313 of FIG. 3 or server 110 of FIG. 1), generates or renders content for presentation to the user. Content generated or rendered by a software application may be generated or rendered in response to inputs received from the user via movement of the optical sensor device 305 or I/O interface 317.

Examples of software applications, stored on application store 321, include gaming applications, conferencing applications, video playback applications, or programmable instructions for performing the various methods described herein. In preferred embodiments of the present arrangements, application store 321 may be a non-transitory memory store that also stores data obtained from non-optical sensor 340, imaging device 315 or from other sources included in optical sensor 305 or received from processing subsystem 313.

Tracking module 323 may calibrate eyewear 322 using one or more calibration parameters and may adjust the calibration parameters to reduce error in determination of the position of optical sensor device 305 or of I/O interface 317. Additionally, tracking module 323 may track movements of optical sensor device 305 or of I/O interface 317 using information from imaging device 315, to one or more position sensors 335, IMU 342, or some combination thereof. I/O interface 317 may represent a component that allows a user to send action requests and receive responses from processing subsystem 313. In some embodiments of the present arrangements, an external controller may send such action requests and receive such responses via I/O interface 317. An action request may, in some examples, represent a request to perform a particular action. By way example, an action request may be an instruction to start or end capture of image or video data or an instruction to perform a particular action within a software application. I/O interface 317 may include one or more input devices. Exemplar input devices include keyboard, mouse, hand-held controller, or any other suitable device for receiving action requests and communicating the action requests to processing subsystem 313.

Further, I/O interface 317 may permit eyewear 322 to interact, via a wired or wireless channel, with external devices and/or system accessories, such as additional standalone-sensor systems or hand-held controllers. In preferred embodiments of the present arrangements, optical sensor device 305, processing subsystem 313, and/or I/O interface 317 may be integrated into a single housing or body. Other embodiments may include a distributed configuration of eyewear 322, in which optical sensor device 305 may be in a separate housing or enclosure, but still coupled to processing subsystem 313 by a wired or wireless communication channel. By way example, optical sensor device 305 may be coupled to processing subsystem 313 that resides inside or is provided by an external gaming console or an external computer, such as a desktop or laptop computer. Processing subsystem 313 may also be a specialized hardware component designed to cooperate specifically with optical sensor system 305 to perform various operations described herein.

Eyewear 322 may use, among other things, a matrix of variable-phase optical elements (e.g., diffractive optical elements (DOEs)) to introduce phase delays into a wavefront of light received through a lens, thereby enhancing the performance of optical sensor device 305, or specifically one or more of imaging devices 315 that capture aspects of a scene. These enhancements may be a function of how light passes through the variable-phase optical elements and, in some present arrangements, may also be a function of shifting the matrix or another optical component (e.g., a sensor or a lens) of eyewear 322. By way of example, the phase delays introduced by the matrix of variable-phase optical elements may enable eyewear 322 to capture at least two different perspectives of a scene, and the different embodiments of XR systems described herein may use these different perspectives to provide or increase resolution (e.g., in an angular, depth, and/or spectral dimension) of output images or frames obtained from optical sensor device 305.

Different embodiments of an optical sensor device (e.g., optical sensor device 305 of FIG. 3) disclosed herein may use variable-phase optical elements to capture different perspectives of a scene in a variety of different manners and for numerous different purposes. By way of example, a DOE may be configured to, while in an initial position, disperse light from a scene as an interference pattern on the optical sensor device, which may capture the interference pattern as a first perspective of the scene. The DOE may be shifted laterally to a subsequent position such that the resulting interference pattern represents another perspective of the scene, which may also be captured by the optical sensor device. These two perspectives may be processed to increase angular resolution (e.g., via oversampling) or to provide depth sensing (e.g., via triangulation and/or phase discrimination).

By way of example, depth values of a scene may be obtained using triangulation between two perspectives, by using a DOE to provide the two perspectives to a single optical sensor device. As another example, each element within a layer or matrix of variable-phase optical elements may be configured to deterministically phase-shift and focus light onto particular pixels (or sets of pixels) of the optical sensor device. These phase-shifted wavefronts, which may represent different perspectives of a scene, may be captured, mixed, and compared against a reference signal to detect depth within a scene.

Embodiments of the present arrangements described herein may also be implemented within various types of systems (e.g., traditional CMOS sensor systems, time-of-flight (ToF) systems, or hyperspectral imaging systems) having diverse configurations (e.g., configurations with static or movable optical components). As an example of an implementation with movable optical components (e.g., when a user choses to move an optical sensor), the optical sensor device may include a matrix of variable-phase optical elements positioned over individual pixels or voxels of an imaging device and an actuator configured to move a component of the optical sensor device (e.g., the matrix, a sensor or a lens) to obtain two different images representing two different instantaneous fields of view (iFOVs) per pixel. The system may then analyze these images to obtain or deduce additional spatial information for the imaged scene. In some examples with a ToF sensor, a scene may be captured in greater spatial resolution by using a conventional large pixel ToF sensor system and translating the component to oversample the portion of the image plane or scene. In examples with a non-ToF sensor (e.g., a traditional CMOS sensor), the system may perform a triangulation operation and/or a phase-discrimination operation on the different iFOVs to calculate a depth map of the scene. The system may also, for both non-ToF and ToF sensors, interpolate between the phase-shifted iFOVs to improve angular resolution of images captured by the sensors.

The oversampling process may also be used to increase spatial resolution in various hyperspectral imaging systems (e.g., snapshot hyperspectral imaging systems). Traditional hyperspectral imaging may use hyperspectral filters (e.g., tiled filters or mosaic filters) disposed directly on an imaging device to sample broadband light in the spectral domain, which may increase spectral resolution at the expense of spatial resolution. In contrast, the proposed hyperspectral imaging system may decouple the hyperspectral filters from the imaging device and position the variable-phase optical elements between the filters and the imaging device to facilitate spatial oversampling and improved spatial resolution. For example, a scene may be captured in a hyperspectral image in greater spatial resolution by translating the variable-phase optical elements to oversample portions of the image plane or scene through the individual windows of the hyperspectral filter.

In one embodiment of the present optical sensor device, each optical component is fixed in a single position and/or movable among two or more positions in a plane perpendicular to the optical axis. For example, a system with fixed optical components may introduce two or more different phase shifts in an incident wavefront. These phase-shifted signals may then be mixed and compared with a reference signal. As another example, a global shutter system may include optical elements that create two phase-shifted optical paths that are captured and stored by the imaging device while the optical elements are in a first position. The system may then shift the optical elements to a second position to create two additional phase-shifted optical paths, which may also be captured by the imaging device. As a result, the imaging device may simultaneously provide four phase-shifted signals to an electrical quadrature demodulation component, where they may be mixed and compared to a reference signal to create a depth map of a scene.

Figure 4A:
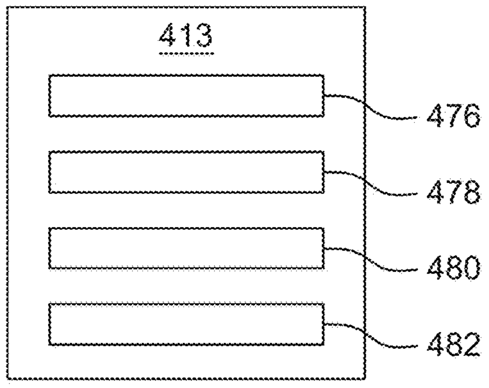
FIG. 4A shows a block diagram of the various software modules and a rendering engine, according to one embodiment of the present arrangements, present inside a processor, e.g., inside the processor-based eyewear of FIG. 3 or the server of FIG. 1.

FIG. 4A shows a block diagram of the various software modules and an engine, each of which include programmable instructions to carry out one or more steps, involved in the implementation of different methods according to the present teachings. A processing subsystem 413 present in a client device (e.g., processing subsystem 313 of an eyewear 322 of FIG. 3) or in a server (e.g., server 110 of FIG. 1) include an image spatializing module 476, an attribute spatializing module 478, an aligning module 480 and a rendering engine 482.

Image spatializing module 476 includes, among other things, programmable instructions for spatializing a first type of pixel or voxel data to create a first type of three-dimensional spatialized data. Attribute spatializing module 478 includes, among other things, programmable instructions for spatializing a second type of three-dimensional pixel or voxel data to create a second type of three-dimensional spatialized data, which is of different type than the first type of three-dimensional spatialized data. Aligning module 480 includes, among other things, programmable instructions for aligning the first type of three-dimensional spatialized data with the second type of three-dimensional spatialized data to create an enhanced three-dimensional spatialized environment. Rendering engine 482 includes, among other things, programmable instructions for rendering, on a display component, the "processed information," i.e., an enhanced three-dimensional spatialized environment. Although rendering engine 482 is described as a preferred embodiment, the present arrangements contemplate use of other types of engines, such as a display engine, a data engine, an execution engine, or user interface (UI) engine to achieve different results contemplated by the present teachings.

It is not necessary that each of the different modules and engine presented in FIG. 4A be disposed on a processor subsystem. According to the present arrangements, these module and engine may include a distributed configuration, in which certain modules may reside on an optical sensor device (e.g., optical sensor device 305 of FIG. 3) that is coupled to a processing subsystem (e.g., processing subsystem 313, or one that resides on a smartphone or a personal computer) by a wired or wireless communication channel. In this configuration, the processing subsystem is, preferably, a specialized hardware component designed to cooperate specifically with an optical sensor and/or a non-optical sensor to perform various operations described herein.

Figure 4B:
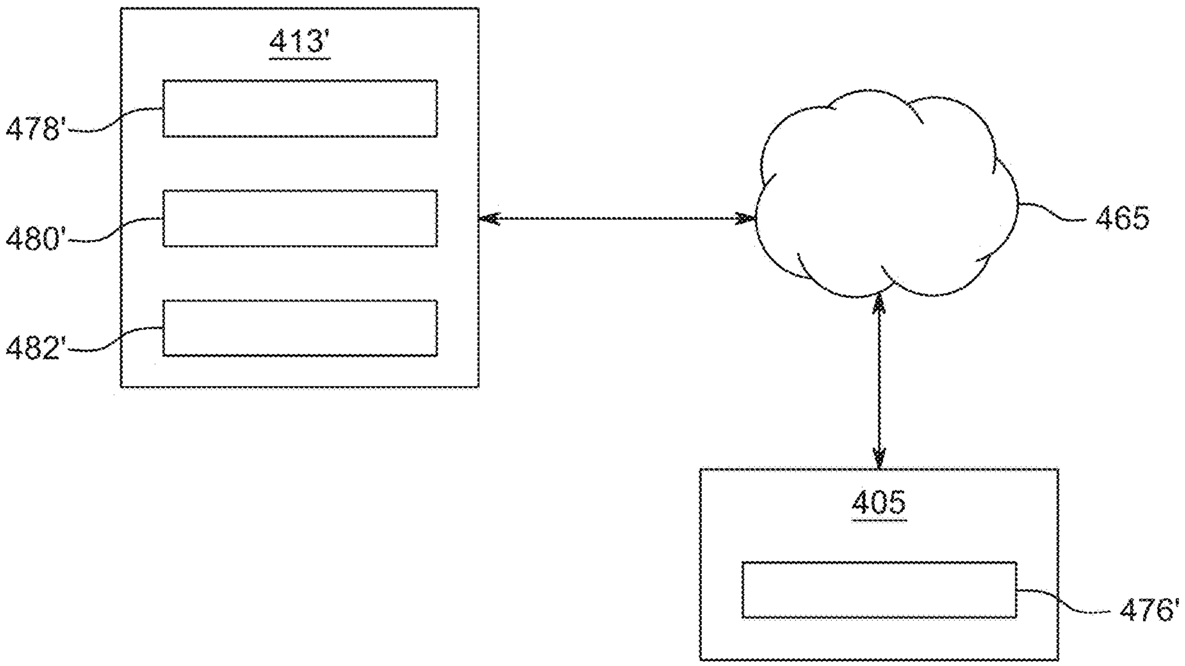
FIG. 4B shows a block diagram of the various software modules and a rendering engine, according to an alternative embodiment of the present arrangements, present inside a processor, e.g., inside the processor-based eyewear of FIG. 3 or the server of FIG. 1, and an eyewear, such as the ones shown in FIGS. 1, 2 and 3.

FIG. 4B shows one exemplar distributed configuration of the modules and engine shown in FIG. 4A. According to FIG. 4B, a processor subsystem 413' includes attribute spatializing module 478', aligning module 480' and rendering engine 482', each of which are substantially similar to their counterparts shown in FIG. 4A, i.e., attribute spatializing module 478, aligning module 480 and rendering engine 482. Processing subsystem 413' of FIG. 4B is communicatively coupled via a network (e.g., The Internet) 465 to an optical sensor device 405. Further, optical sensor device 405 is similar to optical sensor device 305 of FIG. 3, except that optical sensor device 405 includes an image spatializing module 476'. The programmable instructions contained inside image spatializing module 476' of FIG. 4B are substantially similar to those found in image spatializing module 476 of FIG. 4A. In this distributed configuration, the image spatializing module in the optical sensor device and the modules and rendering engine in the processor subsystem cooperate to carry out the present methods described herein.

Figure 5:
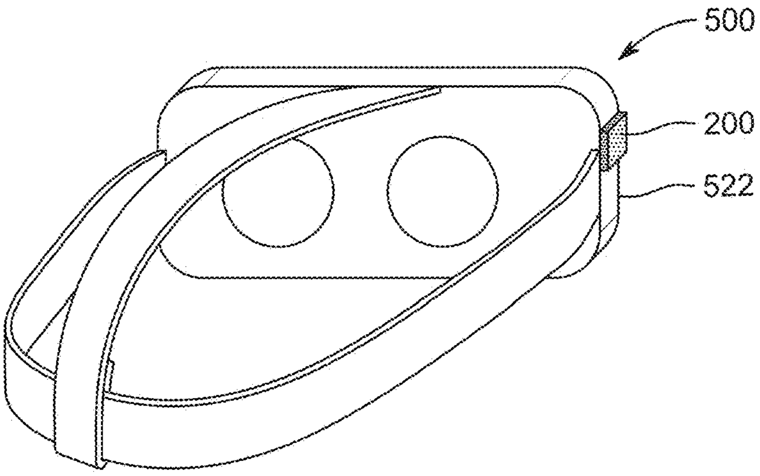
FIG. 5 shows an XR system, according to one embodiment of the present arrangements and that has stored therein programmable instructions for carrying out certain methods of the present teachings described herein.

FIG. 5 shows an XR system 500, according to one embodiment of the present arrangements. In this embodiment, an eyewear 522 has stored therein programmable instructions 200 for carrying out certain methods of the present teachings described herein. In one embodiment of the present arrangements, eyewear 522 is substantially similar to at least one of eyewear 122 of FIG. 1, eyewear 222 of FIG. 2 or eyewear 322 of FIG. 3. In one preferred embodiment of the present arrangements, programmable instructions 200 include an image spatializing module 476, an attribute spatializing module 478, an aligning module 480 and a rendering engine 482 of FIG. 4.

Figure 6:
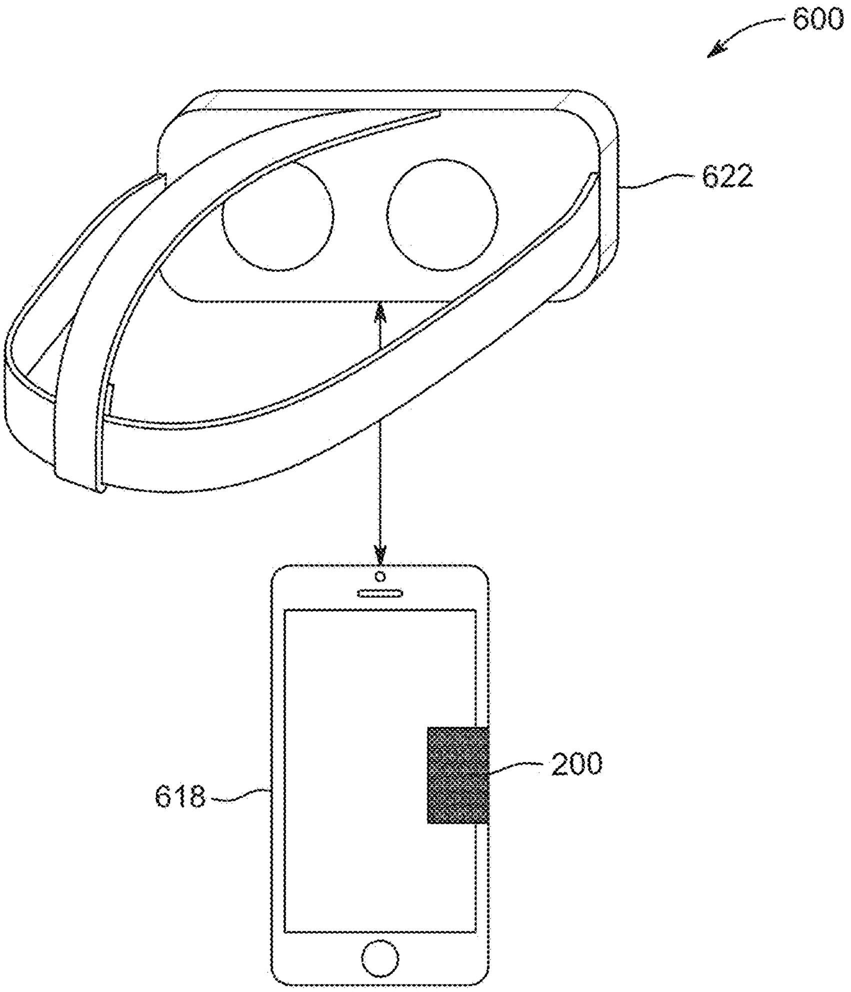
FIG. 6 shows an XR system, according to another embodiment of the present arrangements and that includes an eyewear communicatively coupled to a smartphone, which has stored therein programmable instructions for carrying out certain methods of the present teachings described herein.

FIG. 6 shows an XR system 600, according to one embodiment of the present arrangements. In this embodiment, an eyewear 622, which is substantially similar to at least one of eyewear 122 of FIG. 1, eyewear 222 of FIG. 2 or eyewear 322 of FIG. 3, is communicatively coupled to a smartphone 618. In one aspect of this embodiment, smartphone 618 is substantially similar to smartphone 118 of FIG. 1. Further, in the XR system of FIG. 6, smartphone 618 has programmable instructions 200 stored therein for carrying out certain methods of the present teachings described herein. In an alternative embodiment of the present arrangements, modules and engine that comprise programmable instructions 200 are distributed between smartphone 618 and eyewear 622. In one implementation of this alternative embodiment, the distributed configuration of software modules is implemented between a processor subsystem that resides inside smartphone 618 and eyewear 622. The present arrangements recognize that programmable instructions, in a distributed configuration, are not limited to client devices.

Figure 7:
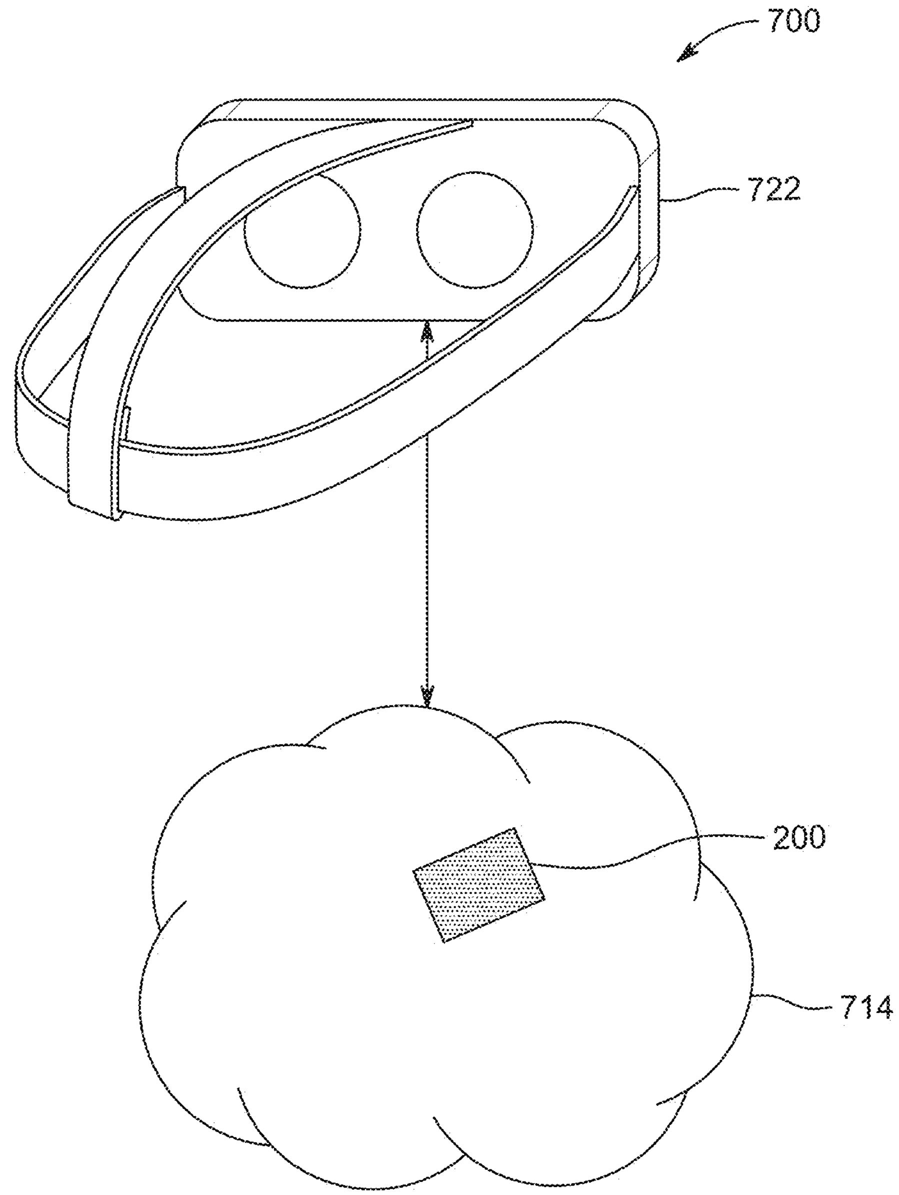
FIG. 7 shows an XR system, according to yet another embodiment of the present arrangements and that includes an eyewear communicatively coupled to a network (e.g., the Internet), which has stored therein programmable instructions for carrying out certain methods of the present teachings described herein.

To this end, FIG. 7 shows an XR system 700, according to an alternative embodiment of the present arrangements. In this embodiment, an eyewear 722 is communicatively coupled to a network (e.g., the Internet) 714, which has stored therein either all of or at least some of the modules or engine that comprise programmable instructions 200. Eyewear 722 is substantially similar to at least one of eyewear 122 of FIG. 1, eyewear 222 of FIG. 2 or eyewear 322 of FIG. 3, and network 714 is substantially similar to at least one of network 114 of FIG. 1, communication bus 365 of FIG. 3 or network 465 of FIG. 4B.

Figure 8:
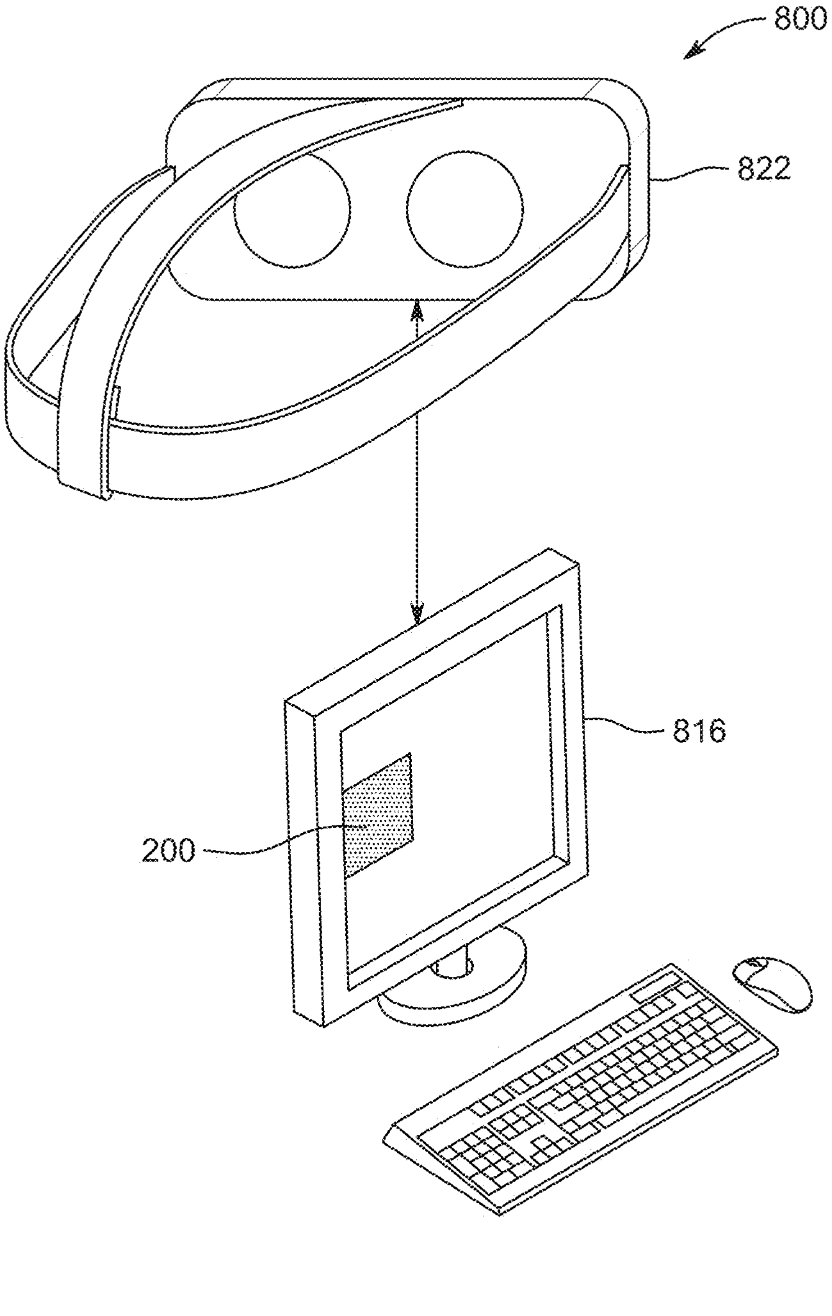
FIG. 8 shows an XR system, according to yet another embodiment of the present arrangements and that includes an eyewear communicatively coupled to a personal computer, which has stored therein programmable instructions for carrying out certain methods of the present teachings described herein.

FIG. 8 shows an XR system 800, according to yet another embodiment of the present arrangements. In this embodiment, an eyewear 822 is communicatively coupled to a personal computer 816, which may function as a client device and/or a server. In one embodiment, a processing subsystem, which resides inside personal computer 816, has stored therein programmable instructions 200 for carrying out certain methods of the present teachings described herein. In an alternative implementation of the XR system shown in FIG. 8, the modules and engine that comprising programmable instructions 200 are distributed between personal computer 816 and eyewear 822.

Figure 9:
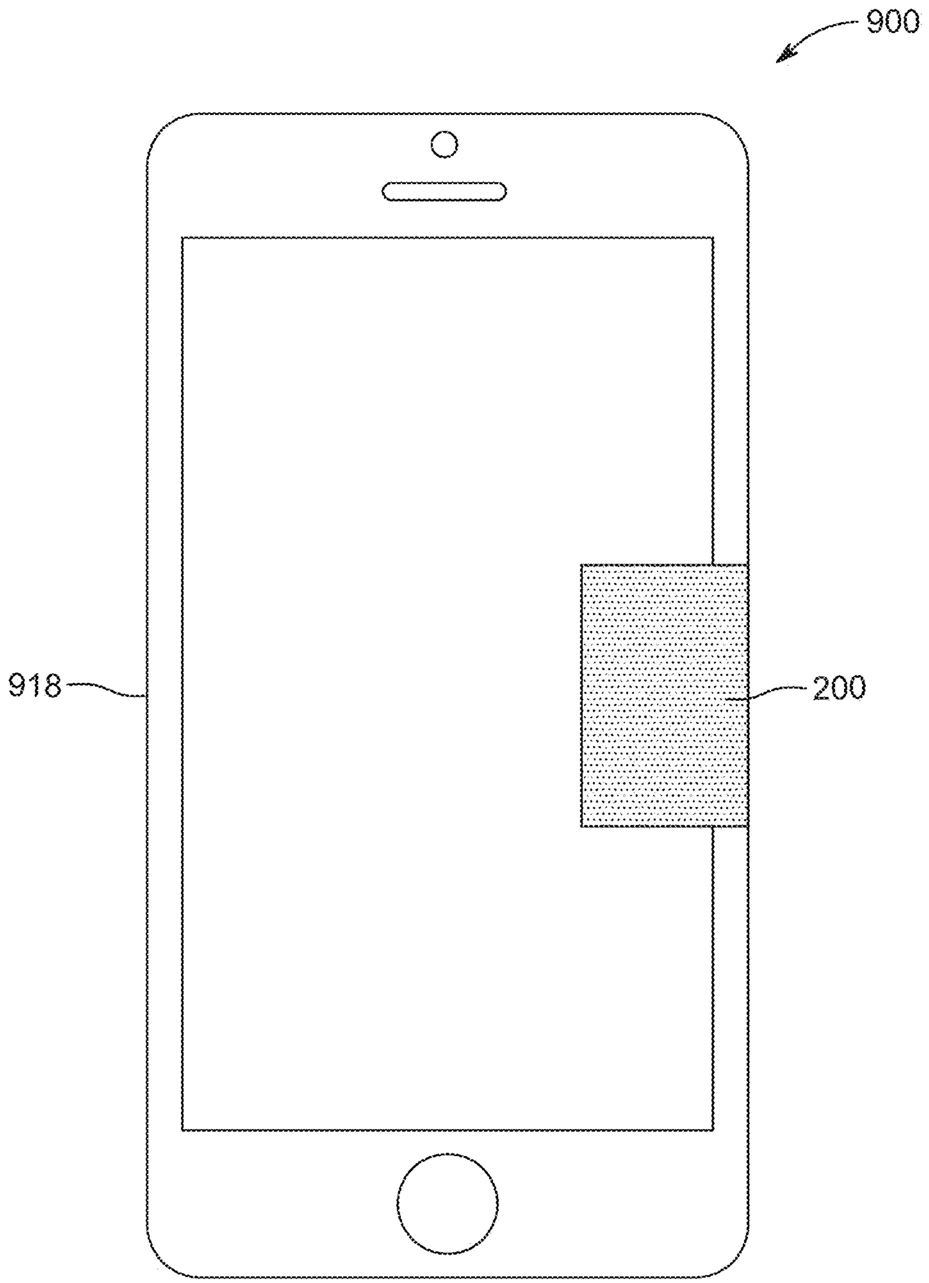
FIG. 9 shows an XR system, according to yet another embodiment of the present arrangements and that has stored therein programmable instructions for carrying out, in the absence of eyewear, certain methods of the present teachings described herein.

FIG. 9 shows an XR system 900, according to another embodiment of the present arrangements and that is a smartphone 918, which has stored therein programmable instructions 200. In this embodiment, smartphone 918 includes a display, upon which the "processed information" resulting from analysis of different types of datasets is rendered. As a result, XR system of FIG. 9 does not require an eyewear to perform certain methods of the present teachings described herein.

Figure 10:
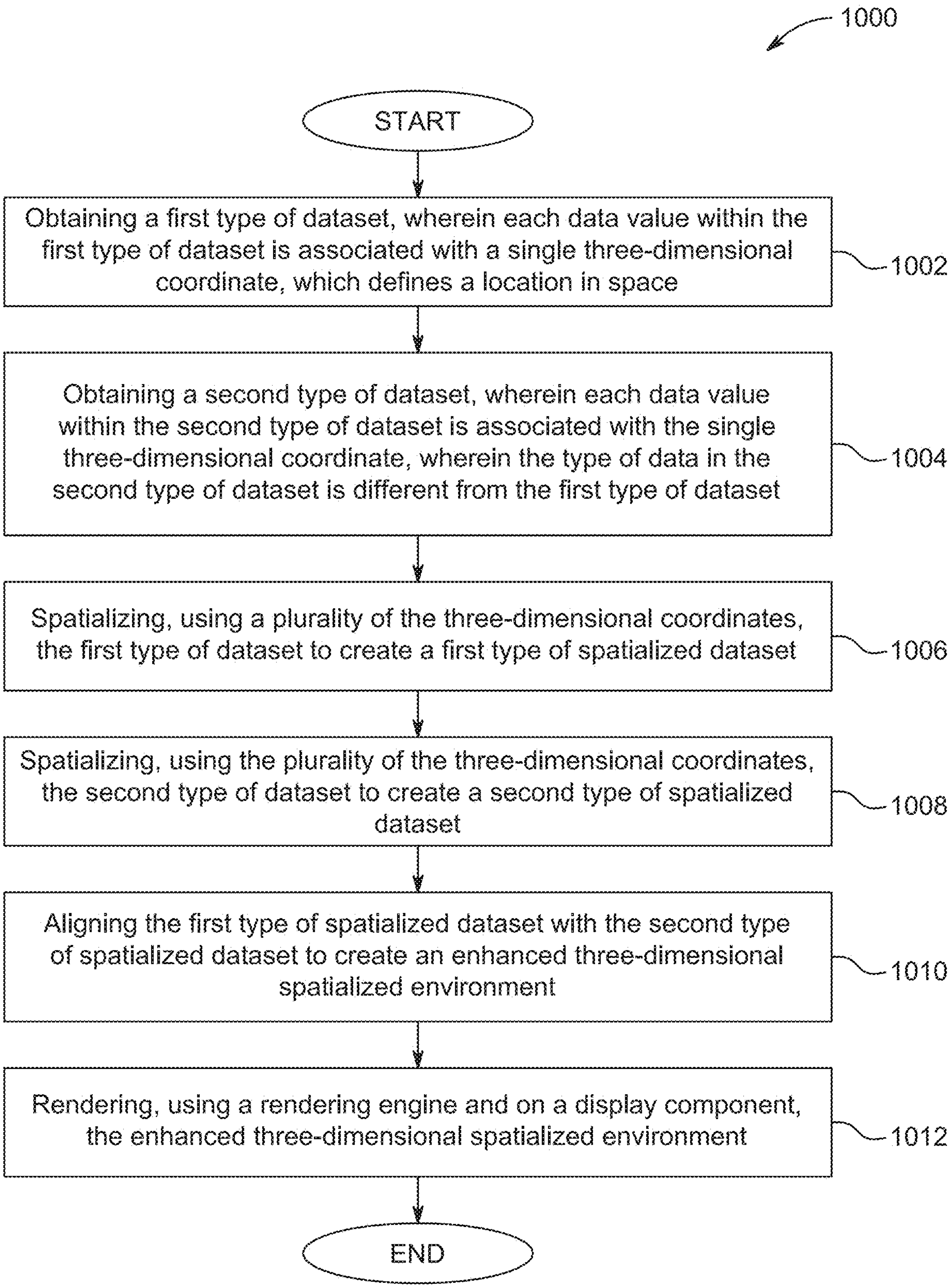
FIG. 10 shows a process flow diagram for a method, according to one embodiment of the present teachings, for rendering two different types of datasets.

In one aspect, the present teachings offer methods for rendering two or more different types of datasets. FIG. 10 shows a flowchart of a method 1000, in accordance with certain embodiments of the present teachings, for rendering two different types of datasets. Method 1000, preferably, begins with a step 1002, which involves obtaining a first type of dataset. The first type of dataset includes a plurality of first data values. Each first data value, within the first type of dataset, is associated with one or more three-dimensional coordinates. Further, the three-dimensional coordinates define a particular location or a region in real space.

In one embodiment of the present teachings, a ground positioning component (e.g., position sensor 335 of FIG. 3) and a first sensor provide or facilitate provision of the first type of dataset. The ground positioning component informs on the position of the measurements taken when obtaining the first dataset described in step 1002. The ground positioning component, in preferred embodiments of the present arrangements, uses relative positioning techniques, as opposed to making an absolute position measurement, as encountered when using a global positioning system ("GPS") sensor, to arrive at the three-dimensional coordinates. Further, the three-dimensional coordinates, in these preferred embodiments, are obtained using positioning measurements relative to one or more reference points or coordinates. The ground positioning component may be disposed in an eyewear (e.g., eyewear 222 of FIG. 2 or eyewear 322 of FIG. 3).

The first sensor may be an optical sensor (e.g., optical sensor 305 of FIG. 3) or a non-optical sensor (e.g., non-optical sensor 340 of FIG. 3), and like the ground positioning component, be disposed in an eyewear. In the event, the present arrangements rely on obtaining the first data set from a storage medium, such as a first database, then the storage medium may reside inside or be communicatively coupled to the eyewear, so that the first dataset information is available for processing as described below.

Method 1000 also involves a step 1004, which includes obtaining a second type of dataset, which is different from the first type of dataset. In one embodiment of the present teachings, however, either one or both of the first type of dataset and the second type of dataset represent a measured parameter, e.g., magnitude, of one or more intangible properties present in a real space. Examples of such intangible properties include throughput of a connectivity signal, latency of a connectivity signal, interference of a connectivity signal, volatility of a connectivity signal, stability of a connectivity signal, RF power output, EMF, atmospheric pressure, geomagnetic, hall effect, ambient light level, gas levels, smoke, sound pressure, audio harmonics, humidity, carbon dioxide emission, or temperature.

Moreover, the second dataset, like the first dataset, is associated with one or more of the three-dimensional coordinates. As a result, when the first dataset and the second dataset are obtained, the location information relating to the data values, within each dataset, is known. To this end, the disclosure of the nature and functions of the ground positioning component, the first sensor and the first database, as described above in the connection with the first dataset of step 1002, apply equally to obtaining the second dataset of step 1004. The second dataset may also be obtained using a second sensor and a second database. Like the first sensor, the second sensor may be an optical sensor (e.g., optical sensor 305 of FIG. 3) or a non-optical sensor (e.g., non-optical sensor 340 of FIG. 3), and may be disposed in an eyewear or in an external device, which is external to the eyewear. The second database may reside inside or communicatively coupled to the eyewear.

After a requisite number of first data values are obtained from step 1002, method 1000 may then proceed to a step 1006, which involves spatializing, using a plurality of the three-dimensional coordinates, the first type of dataset to create a first type of spatialized dataset. In preferred embodiments of the present teachings, an image spatializing module (e.g., image spatializing module 476 of FIG. 4A or image spatializing module 476' of FIG. 4B) is used to create the first type of spatialized dataset. The image spatializing module may reside on an eyewear or on an external processor. If the image spatializing module resides on the external processor, then the external processor, which is external to the eyewear, is communicatively coupled to the eyewear to convey to it the "processed information," resulting from processing of the first type of spatialized dataset.

In those embodiments where an image spatializing module is used in step 1006, this module begins the spatializing step by, preferably, spatially partitioning the real space into plurality of subdivisions. Then, the image spatializing module integrates the subdivisions to create a spatialized model of the real space. In the spatializing step 1006, the first data values may be distributed, based upon the spatialized model, to create the first type of spatialized dataset. Further, "real space," in the present methods, is electronically represented using a plurality of the three-dimensional location coordinates, which may have been retrieved from steps 1002 and/or 1004.

Any time after the second dataset is obtained from step 1004, method 1000 may then proceed to a step 1008, which involves spatializing, using the plurality of the three-dimensional coordinates, the second type of dataset to create a second type of spatialized dataset. In preferred embodiments of the present teachings, an attribute spatializing module (e.g., attribute spatializing module 478 of FIG. 4A or attribute spatializing module 478' of FIG. 4B) is used to create the second type of spatialized dataset. The attribute spatializing module may reside on an eyewear or on an external processor. If the attribute spatializing module resides on the external processor, then the external processor, which is external to the eyewear, is communicatively coupled to the eyewear to convey to it the "processed information," resulting from processing of the second type of spatialized dataset.

In those embodiments where an attribute spatializing module is used in step 1008, this module, like the image spatializing module of step 1006, begins the spatializing step by, preferably, spatially partitioning the real space into plurality of subdivisions. Then, the attribute spatializing module integrates the subdivisions to create a spatialized model of the real space. In the spatializing step 1008, the second data values may be distributed, based upon the spatialized model, to create the second type of spatialized dataset.

In one implementation of method 1000, if a spatialized model is created one of an image spatializing module or an attribute spatializing module, then the other spatializing module is free to use the created spatializing model, without the need for creating another or recreating a spatialized model to effect distribution of the first or second data values, as the case may be.

Once the two datasets are spatialized to form the first type and the second type of spatialized datasets, then method 1000 may proceed to step 1010, which involves aligning the first type of spatialized dataset with the second type of spatialized dataset to create an enhanced three-dimensional spatialized environment. In preferred embodiments of the present teachings, an aligning module (e.g., an aligning module 480 of FIG. 4A or an aligning module 480' of FIG. 4B) is used to carry out aligning step 1010. The aligning module may reside on an eyewear or on an external processor, which is disposed external to and communicatively coupled to the eyewear. In method 1000, the enhanced three-dimensional spatialized environment represents the "processed information" that is subsequently rendered on a display component of an eyewear or a smartphone.

Regardless of where it is located, the analyzing module may use one or more common spatial features present in both the first type of spatialized dataset and the second type of spatialized dataset to effect alignment of the two spatialized datasets. Examples of such common spatial features include vertex, longitude or latitude. However, using one or more common vertices, found in both the first type of spatialized dataset and the second type of spatialized dataset, to effect alignment represents a preferred embodiment of step 1010.

After completing the alignment of two spatialized datasets, method 1000 proceeds to a step 1012, which includes rendering, using a rendering engine (e.g., rendering engine 482 of FIG. 4A or rendering engine 482 of FIG. 4B), the enhanced three-dimensional spatialized environment. In certain embodiments of the present arrangements, the rendering engine may reside on an eyewear or on an external processor, that is disposed external to and communicatively coupled to the eyewear.

The rendering step may render the enhanced three-dimensional spatialized environment on a display component (e.g., display component that is fitted with frame 202 of FIG. 2 or I/O interface 317 of FIG. 3). In certain exemplar embodiments, the display component is integrated into a client device, which is at least one device chosen from a group comprising wearable, smartphone, and computer. In preferred embodiments of the present teachings, the wearable is an eyewear (e.g., eyewear 222 of FIG. 2 or eyewear 322 of FIG. 3).

Figure 11:
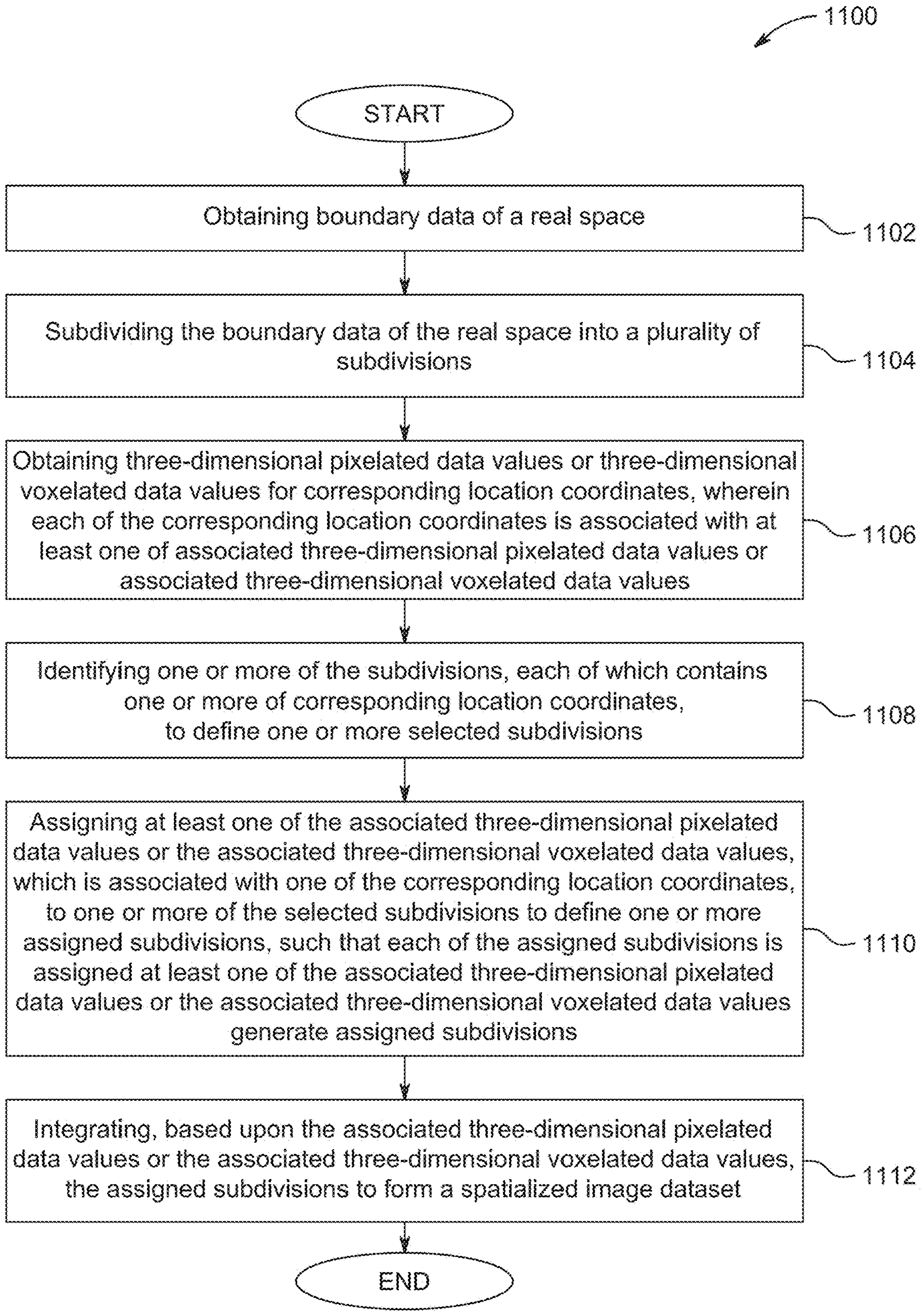
FIG. 11 shows a process flow diagram for a method, according to one embodiment of the present teachings, for spatializing an image dataset.

The present teachings offer novel methods for rendering an image dataset. FIG. 11 shows a flowchart for one exemplar method 1100 that, preferably, begins with a step 1102 obtaining boundary data of a real space. In certain embodiments, step 1102 of the present teachings includes obtaining three-dimensional coordinates that define, i.e., electronically represent, a boundary of a scene. A scene is commonly present in real space in front of a user of the eyewear.

Next, method 1100 includes a step 1104 that requires subdividing the boundary data of the real space into a plurality of subdivisions. In certain embodiments, step 1104 of the present teachings involves subdividing the electronically represented boundary obtained in step 1102, such that each of the resulting subdivisions is electronically represented by three-dimensional subdivision boundary coordinates. In other embodiments of the present teachings, subdividing described in step 1104 includes spatially partitioning a real space into a plurality of subdivisions. In these embodiments, a plurality of corresponding three-dimensional location coordinates collectively forms an electronic representation of the real space and this space undergoes spatial partitioning. The word "corresponding," used in connection with term "location coordinate," as it appears in method 1100, conveys that the "location coordinate" is one where at least one pixelated or at least one voxelated value was obtained. Hence, the "location coordinate," "corresponds" to, or has a connection with, the pixelated or voxelated values obtained there.

Method 1100 involves a step 1106, which includes obtaining three-dimensional pixelated data values or three-dimensional voxelated data values for corresponding location coordinates. In this step, each of the corresponding location coordinates is "associated" with at least one of associated three-dimensional pixelated data values or at least one associated three-dimensional voxelated data values. The word "associated," used in connection with the terms "three-dimensional pixelated data values" and "three-dimensional voxelated data values," conveys that the pixelated or the voxelated values, obtained at a particular location coordinate, are "associated" with that location coordinate.

In one example of step 1106, obtaining the three-dimensional pixelated data values or the three-dimensional voxelated data values includes measuring light intensity or measuring color intensity present at a unit pixel area or a unit voxel (volumetric) space, respectively, of an optical sensor (e.g., optical sensor 305 of FIG. 3).

According to one embodiment of the present teachings, step 1106 is carried out in a manner that is substantially similar to step 1002 of FIG. 10. Further, the different embodiments, e.g., using an optical sensor or a database to obtain the required data values, described in connection with step 1002 of FIG. 10, may be similarly implemented in step 1106 of FIG. 11.

Once the subdivisions are obtained, method 1100 may proceed to step 1108, which involves identifying one or more of the subdivisions that contain one or more of the corresponding location coordinates. Such subdivisions are, preferably, referred to as "selected subdivisions," and step 1108 generates one or more of such selected subdivisions. In other words, selected subdivisions simply refer to those subdivisions (i.e., resulting from step 1104) that include at least one three-dimensional location coordinate, i.e., at least one location from where a measurement of the pixelated or the voxelated values was obtained.

Then, method 1100 advances to a step 1110 that includes assigning at least one of the associated three-dimensional pixelated data values or the associated three-dimensional voxelated data values to one or more of the selected subdivisions to define one or more assigned subdivisions. In this step, each of the three-dimensional pixelated data values or the associated three-dimensional voxelated data values, which are associated with at least one of the corresponding location coordinates, are assigned to the selected subdivisions. Further, after the assignment, these selected subdivisions are referred to as the "assigned subdivisions." Stated another way, each assigned subdivision is assigned at least one of the associated three-dimensional pixelated data values or at least one of the associated three-dimensional voxelated data values.

In one preferred aspect, step 1110 includes assigning at least one of the associated three-dimensional pixelated data values or at least one of the associated three-dimensional voxelated data values to an entire portion of the selected subdivisions. In another preferred aspect, where two or more pixelated or voxelated values are available, step 1110 includes assigning a summation of weighted values of two or more of the associated three-dimensional pixelated data values or a summation of weighted values of two or more of the associated three-dimensional voxelated data values to the selected subdivisions.

After conclusion of step 1110, method 1100 preferably proceeds to a step 1112, which involves integrating the assigned subdivisions to form a spatialized image dataset. In certain preferred embodiments, step 1112 of the present teachings includes integrating a plurality of the three-dimensional subdivision boundary coordinates, which define one or more subdivisions, to form the spatialized image dataset. In other preferred embodiments, step 1112 of the present teachings includes integrating the plurality of subdivisions to create a spatialized model for the real space. In these embodiments, the associated three-dimensional pixelated data values or the associated three-dimensional voxelated data values are distributed, based upon the spatialized model, to create the spatialized image dataset.

Regardless of how they are formed, the spatialized image data set of the present teachings may be further used in other methods described herein to achieve other novel results and the spatialized image data set obtained in method 1100 represent the "processed information" that is rendered in a subsequent step on a display component of an eyewear or a smartphone.

To this end, in an optional implementation, method 1100 may advance to a step of rendering, which uses a rendering engine, to render the spatialized image dataset on a display component of a client device. In one embodiment of the present teachings, the optional rendering step of method 1100 is carried out in a manner that is substantially similar to rendering step 1012 of FIG. 10. Further, the different embodiments described in connection with rendering step 1012 of FIG. 10 may be similarly implemented in the optional rendering step of method 1100.

Figure 12:
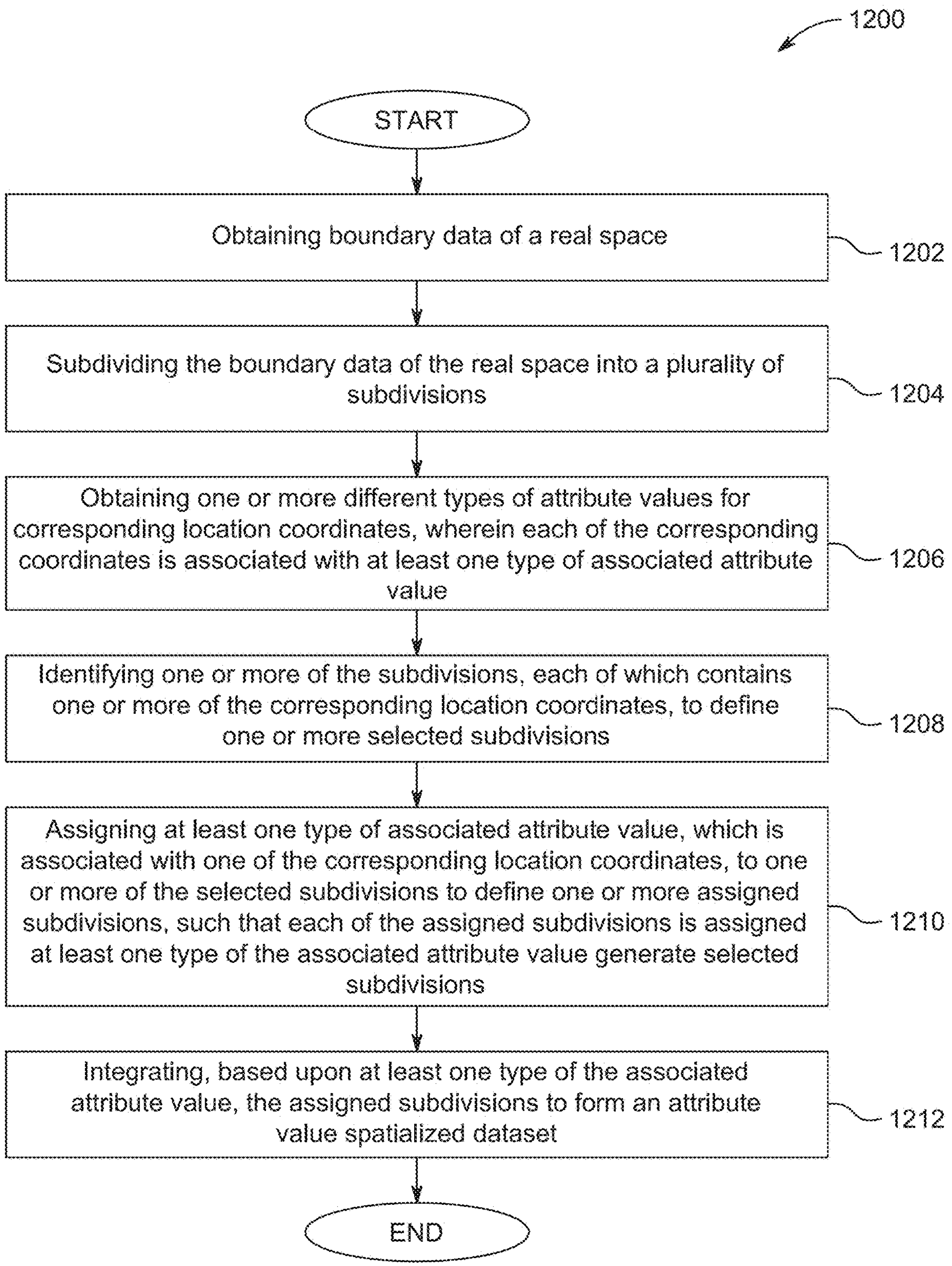
FIG. 12 shows a process flow diagram for a method, according to one embodiment of the present teachings, for spatializing one or more different types of attribute value datasets, and an attribute value conveys a magnitude of an intangible property present within a real space.

In another aspect, the present teachings offer novel methods for rendering an attribute value dataset. FIG. 12 shows a flowchart for one exemplar method 1200 that, preferably, begins with a step 1202 obtaining boundary data of a real space. In certain embodiments, step 1202 of the present teachings includes obtaining three-dimensional coordinates that define, i.e., electronically represent, a boundary of a scene. Step 1202 is substantially similar to step 1102 of FIG. 11 and the different embodiments described with respect to step 1102 of FIG. 11 may similarly be implemented to carry out step 1202.

Next, method 1200 includes a step 1204 that requires subdividing the boundary data of the real space into a plurality of subdivisions. Step 1204 is substantially similar to step 1104 of FIG. 11 and the different embodiments described with respect to step 1104 of FIG. 11 may similarly be implemented to carry out step 1204. By way of example, step 1204 of the present teachings may involve subdividing the electronically represented boundary obtained in step 1202, such that each of the resulting subdivisions is electronically represented by three-dimensional subdivision boundary coordinates. As another example, subdividing of step 1204 may include spatially partitioning the real space into a plurality of subdivisions. In this example, a plurality of corresponding three-dimensional location coordinates collectively forms an electronic representation of the real space that undergoes spatial partitioning. The word "corresponding," used in connection with term "location coordinate," as it appears in method 1200, conveys that the "location coordinate" is one where at least one attribute value of a particular type was obtained. Hence, the "location coordinate," "corresponds" to, or has a connection with, the attribute value obtained there.

Method 1200 also includes a step 1206, which requires obtaining one or more different types of attribute values for corresponding location coordinates. In this step, each of the corresponding location coordinates is "associated" with at least one type of attribute values. The word "associated," used in connection with the terms "attribute values," conveys that one or more attribute values, obtained at a particular location coordinate, are "associated" with that location coordinate.

In one example of step 1206, a magnitude of an intangible property of a real space is obtained. In one implementation of this example, step 1206 includes detecting, inside the real space, a value of a parameter, e.g., magnitude, of at least one type of attribute that is chosen from a group comprising throughput of a connectivity signal, latency of a connectivity signal, interference of a connectivity signal, volatility of a connectivity signal, stability of a connectivity signal, RF power output, EMF, atmospheric pressure, geomagnetic, hall effect, ambient light level, gas levels, smoke, sound pressure, audio harmonics, humidity, carbon dioxide emission, and temperature.

According to one embodiment of the present teachings, step 1206 is carried out in a manner that is substantially similar to step 1004 of FIG. 10. Further, the different embodiments, e.g., using a non-optical sensor or a database to obtain the required data values, described in connection with step 1004 of FIG. 10, may be similarly implemented in step 1206 of FIG. 12.

Once the subdivisions are obtained, method 1200 may proceed to step 1208, which involves identifying one or more of the subdivisions that contain one or more of the corresponding location coordinates. Such subdivisions are, preferably, referred to as "selected subdivisions," and step 1208 produces one or more of such selected subdivisions. In other words, selected subdivisions simply refer to those subdivisions (i.e., resulting from step 1204) that include at least one three-dimensional location coordinate, i.e., at least one location from where a measurement of at least one attribute value of a particular type was obtained.

Then, method 1200 advances to a step 1210 that includes assigning at least one of the associated attribute values of at least one type to one or more of the selected subdivisions to define one or more assigned subdivisions. In this step, each of the associated attribute values of a particular type, which are associated with at least one of the corresponding location coordinates, are assigned to the selected subdivisions. Further, after the assignment, these selected subdivisions are referred to as the "assigned subdivisions." Stated another way, each assigned subdivision is assigned at least one of the associated attribute values of a particular type.

In one preferred aspect, step 1210 includes assigning at least one of the associated attribute values of a particular type to an entire portion of the selected subdivisions. In another preferred aspect, where two or more attribute values of a particular type are available, step 1210 includes assigning a summation of weighted values of two or more of the associated attribute values of a particular type to the selected subdivisions.

After conclusion of step 1210, method 1100 preferably proceeds to a step 1212, which involves integrating the assigned subdivisions to form a spatialized attribute value dataset. In certain preferred embodiments, step 1212 of the present teachings includes integrating a plurality of the three-dimensional subdivision boundary coordinates, which define one or more subdivisions, to form the spatialized attribute value dataset. In other preferred embodiments, step 1212 of the present teachings includes integrating the plurality of subdivisions to create a spatialized model for the real space. In these embodiments, the associated attribute values of at least one type are distributed, based upon the spatialized model, to create the spatialized attribute value dataset.

Regardless of how they are formed, the spatialized attribute value data set of the present teachings may be further used in other methods described herein to achieve other novel results and the spatialized attribute value data set represents the "processed information" of method 1200 and is subsequently rendered on a display component of an eyewear or a smartphone.

To this end, in an optional implementation, method 1200 may advance to a step of rendering, which uses a rendering engine, to render the spatialized attribute value dataset on a display component of a client device. In one embodiment of the present teachings, the optional rendering step of method 1200 is carried out in a manner that is substantially similar to rendering step 1012 of FIG. 10. Further, the different embodiments described in connection with rendering step 1012 of FIG. 10 may be similarly implemented in the optional rendering step of method 1200.

Figure 13:
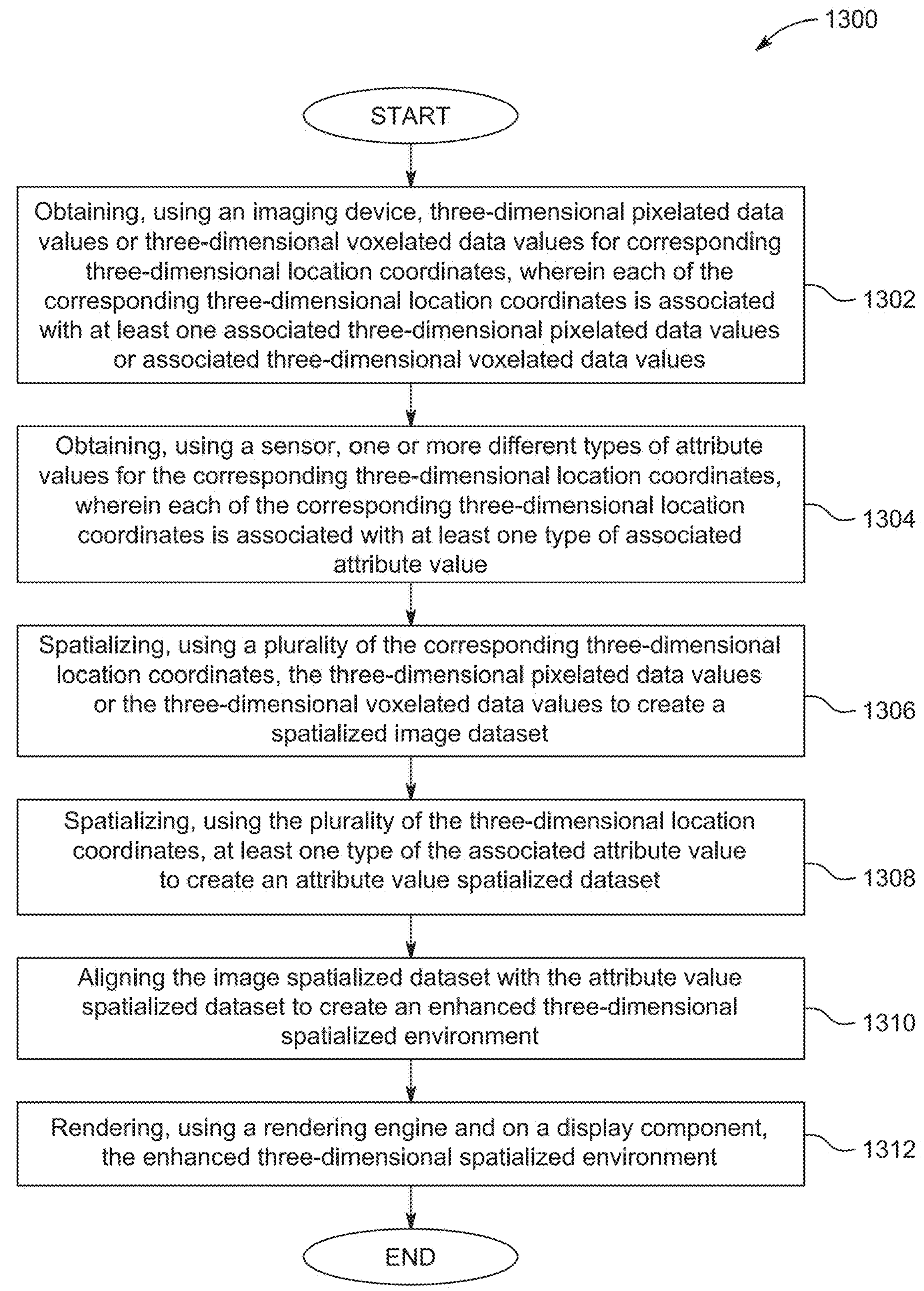
FIG. 13 shows a process flow diagram for a method, according to one embodiment of the present teachings, for rendering an image dataset and an attribute value dataset.

In yet another aspect, the present teachings offer methods for rendering an image dataset and one or more attribute values datasets. FIG. 13 shows a flowchart for a method 1300, according to one embodiment of the present teachings, that renders an image dataset and one or more attribute values datasets.

In a preferred embodiment, method 1300 begins with a step 1302, which includes obtaining three-dimensional pixelated data values or three-dimensional voxelated data values for one or more corresponding three-dimensional location coordinates. In this step, each of the corresponding three-dimensional location coordinates being associated with at least one associated three-dimensional pixelated data values or associated three-dimensional voxelated data values. Step 1302 is, preferably, carried out using an optical sensor and a ground positioning component. Further, the different embodiments described with respect to step 1002 of FIG. 10 may similarly be implemented to carry out step 1302.

Regardless of the methodology and components used, step 1302 provides an image of a real space (e.g., inside four corners of walls inside a room). In certain embodiments of the present teachings, when such an image is taken, using an XR system of the present arrangements, metadata fields may be attached to it. These metadata fields may include at least one information chosen from a group comprising model of an imaging device, time an image was taken, whether a flash was used during image capturing, shutter speed, focal length, light value and a location information provided by a ground positioning component. Accordingly, collections of images may be used to map out a real space such as an office environment (e.g., see FIG. 13). As will be explained below, the data pertaining to the real space is processed, according to the present teachings, to visualize the real space from many perspectives.

Among the many perspectives, a user or a viewer is not only allowed to visualize a three-dimensional replication of the real space, but one or more users or viewers traverse the space using conventional controls such as joysticks, three-dimensional controllers, and keyboards to gather the associated three-dimensional pixelated data values or the associated three-dimensional voxelated data values described in step 1302. To this end, preferably, multiple client devices and controllers under the possession and/or control or users or viewers gather, as is described above in the context of "edge computing," the associated three-dimensional pixelated data values or the associated three-dimensional voxelated data values and the corresponding location coordinates described in step 1302.

Method 1300 also includes a step 1304 that involves obtaining, using at least one non-optical sensor, one or more different types of attribute values for one or more of the corresponding three-dimensional location coordinates. In this step, each of the corresponding three-dimensional location coordinates are associated with at least one type of associated attribute value. The different embodiments described with respect to step 1004 of FIG. 10 may similarly be implemented to carry out step 1304.

The present teachings recognize that steps 1302 and/or 1304 may include many novel implementation features. By way of example, in those instances when multiple client devices and/or external controllers, such as positioning controllers, may be employed to collect different types of data values (e.g., image data values or attribute values) from a user or a viewer, the client device or the external controller, using the ground positioning component or positioning sensors disposed thereon, is aware of its relative position with respect to one or more reference points or coordinates. Moreover, the client devices or the external controllers detect their position when it is within a viewable range on a mobile application and adjusts its own location or opacity or even extends virtual controls based on its location or based on its state. When one or more users or viewers move the client device or the external controller away from the reference point(s) or coordinate(s), the display might ultimately present the same image data and/or the intangible property data for the real space, but the "processed information" may be rendered from a different viewpoint and/or may be rendered from a perspective that is further away in distance.

Steps 1302 and 1304, and even certain subsequent steps described in FIG. 13, conventional three-dimensional mapping techniques may be employed to effectuate certain embodiments disclosed herein. By way of example, different type of datasets may employ different modeling technologies to optimize data visualization and three-dimensional interactivity. Moreover, certain dataset animation may be simulated by rapidly plotting datasets in succession.

As another example, graphical user interface elements may be anchored to a three-dimensional visualization or rendering that presents a state of the selected data analytics. For example, and without limitation, a slider could be mapped to an opacity of a data layer (i.e., corresponds to a dataset of a particular type). As the slider is moved up, the data layer threshold level of the particular type may change and the data layer becomes more opaque; conversely, as the slider is moved down, the data layer of the particular type becomes more transparent. These graphical elements may animate for better usability, such as fading in text or moving arrows and/or lines. In the slider layer example, the actual opacity value and/or a percentage may be drawn on the slider knob itself as it is being slid, and then disappear after a predetermined duration, e.g., about 2 seconds, from a time when the user had finished moving the slider. Thus, the graphical interface elements of the present teachings are capable of conveying both, a state of one or more different types of data, as well as, a state of a client device's or an external controller's buttons and relevant components.

The present teachings recognize that correlating image data with intangible property data allows XR systems of the present arrangements to present a multi-variable view of a physical space in a single rendering.

After step 1302 has obtained a requisite number of pixelated or voxelated values, method 1300 may proceed to a step 1306, which requires spatializing the three-dimensional pixelated data values or the three-dimensional voxelated data values to create a spatialized image dataset. In preferred embodiments, step 1306 relies upon a plurality of the corresponding three-dimensional location coordinates to arrive at the spatialized image dataset. By way of example, one or more steps described in method 1100 of FIG. 11 may be carried out to create the spatialized image dataset. Further, the different embodiments described in connection with one or more steps of method 1100 of FIG. 11, may similarly implemented to carry out step 1306.

After step 1304 has obtained a requisite number of attribute values, method 1300 may proceed to a step 1308, which requires spatializing the associated attribute values of at least one particular type to create a spatialized attribute value dataset of at least that type. Step 1308, like step 1306, may rely upon a plurality of the corresponding three-dimensional location coordinates to arrive at the spatialized attribute value dataset. By way of example, one or more steps described in method 1200 of FIG. 12 may be carried out to create the spatialized attribute value dataset. Further, the different embodiments described in connection with one or more steps of method 1200 of FIG. 12, may similarly be implemented to carry out step 1308.

After a spatialized image dataset and a spatialized attribute value dataset are obtained, method 1300 proceeds to a step 1310, which includes aligning the image spatialized dataset with the attribute value spatialized dataset to create an enhanced three-dimensional spatialized environment. In accordance with one embodiment, step 1310 of the present teachings is substantially similar to step 1010 of FIG. 10 and the different embodiments described in connection with step 1010 of FIG. 10, may similarly be implemented to carry out step 1310. By way of example, one or more common features, e.g., vertex or vertices, longitude or latitude, present in both, the image spatialized dataset and the spatialized attribute value dataset, are used to effect alignment of step 1310. The enhanced three-dimensional spatialized environment of step 1310 represents the "processed information" of method 1300, and in a subsequent step is rendered on a display component of an eyewear and a smartphone.

As a result, method 1300 then proceeds to a step 1312, which involves rendering, using a rendering engine and on a display component, the enhanced three-dimensional spatialized environment. In accordance with one embodiment, step 1312 of the present teachings is substantially similar to step 1012 of FIG. 10 and the different embodiments described in connection with step 1012 of FIG. 10, may similarly be implemented to carry out step 1312.

Each of method 1000 of FIG. 10, method 1100 of FIG. 11, method 1200 of FIG. 12 and method 1300 of FIG. 13 represent different types of programmable instruction of the present teachings that reside on an XR systems of the present arrangements. The present teachings recognize that, although use of XR systems of the present arrangements represent a preferred mode of implementation, these programmable instructions may be implemented using other structural details not described herein.

Figure 14:
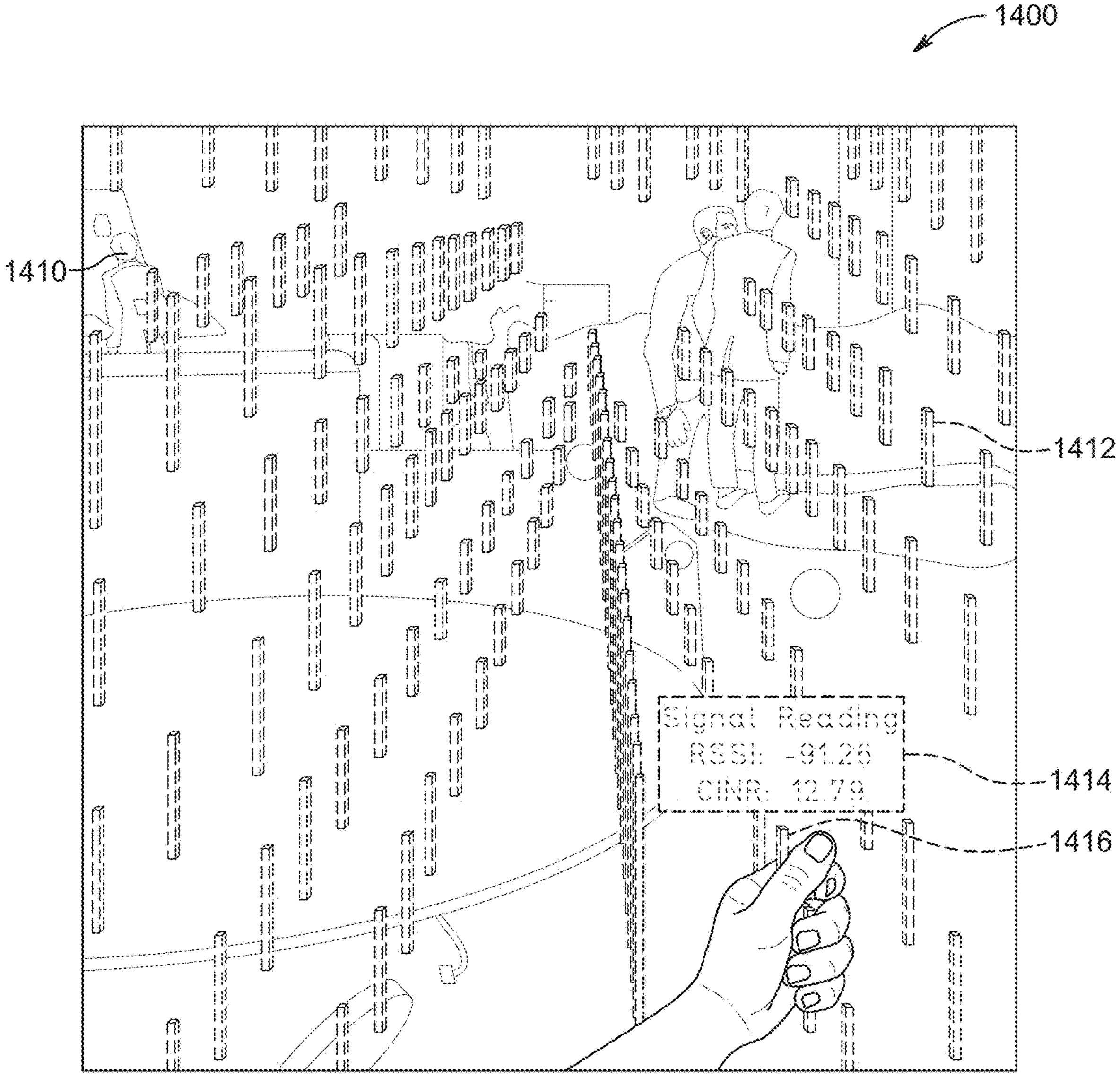
FIG. 14 shows a rendered three-dimensional spatialized image, according to one embodiment of the present arrangements and that depicts a distribution of Wi Fi-connectivity signal strength indicators within a particular real space of interest.

FIG. 14 shows a rendering of an office environment 1400, according to one embodiment of the present teachings. In this rendering of the office environment 1400, a three-dimensional image 1410 of the physical office is overlaid with wireless connectivity signal strength indicators ("RSSI") 1412 that are represented as virtual bars (in dashed lines). RSSI 1412, the original data for which is obtained from step 1304 of FIG. 13, is integrated into image of an office 1410, the original data for which is obtained from step 1302 of FIG. 13. The "processed information," underlying rendered office environment 1400, is developed using step 1410. In the ultimately rendered office environment 1400, the rendered image data, present in a real space, is shown with boundaries of solid lines, and the rendered intangible property data, i.e., RSSI 1412, is shown with boundaries of dashed lines. As a result, rendered office environment 1400 clearly conveys distribution information of RSSI, at different locations, inside the office space.

In one embodiment of the present teachings, animating the different renderings presented in FIG. 14 allows for a user or a viewer to visualize the signal strength distribution from different perspectives, and thereby allowing the viewer or the user to identify areas of good signal strength and/or areas of week signal strength.

In some embodiments of the present teachings, different colors of RSSI 1412 are used to convey varying signal strength values, for example, obtained from different communication systems. In one embodiment, the color representation of a virtual bar, which represents a location of a non-optical sensor signal measurement, i.e., RSSI, may be presented in different colors that vary along a wavelength spectrum and, preferably range from a green color representation to a red color representation. In one preferred embodiment, a green color representation conveys that a measured attribute value of a particular type is greater than an attribute threshold value (e.g., RSSI) of the particular type, and the red color representation conveys that the attribute value of the particular type is less than the attribute threshold value of the particular type. The present teachings recognize that this color-coded virtual bar representation easily conveys RSSI distribution information and represents one of the many advantages of the present teachings that is not available using conventional graphical techniques.

Further, when a user selects or squeezes one selected RSSI 1416, then selected RSSI 1416 may be highlighted and numerical values 1414 associated with selected RSSI 1416 are presented on the display to provide more concrete information about the magnitude of the RSSI measured. The present teachings recognize that virtual bars for RSSI 1412, not only provide actual measured information, but may also provide an estimated or a predicted value of the magnitude of RSSI.

Figure 15:
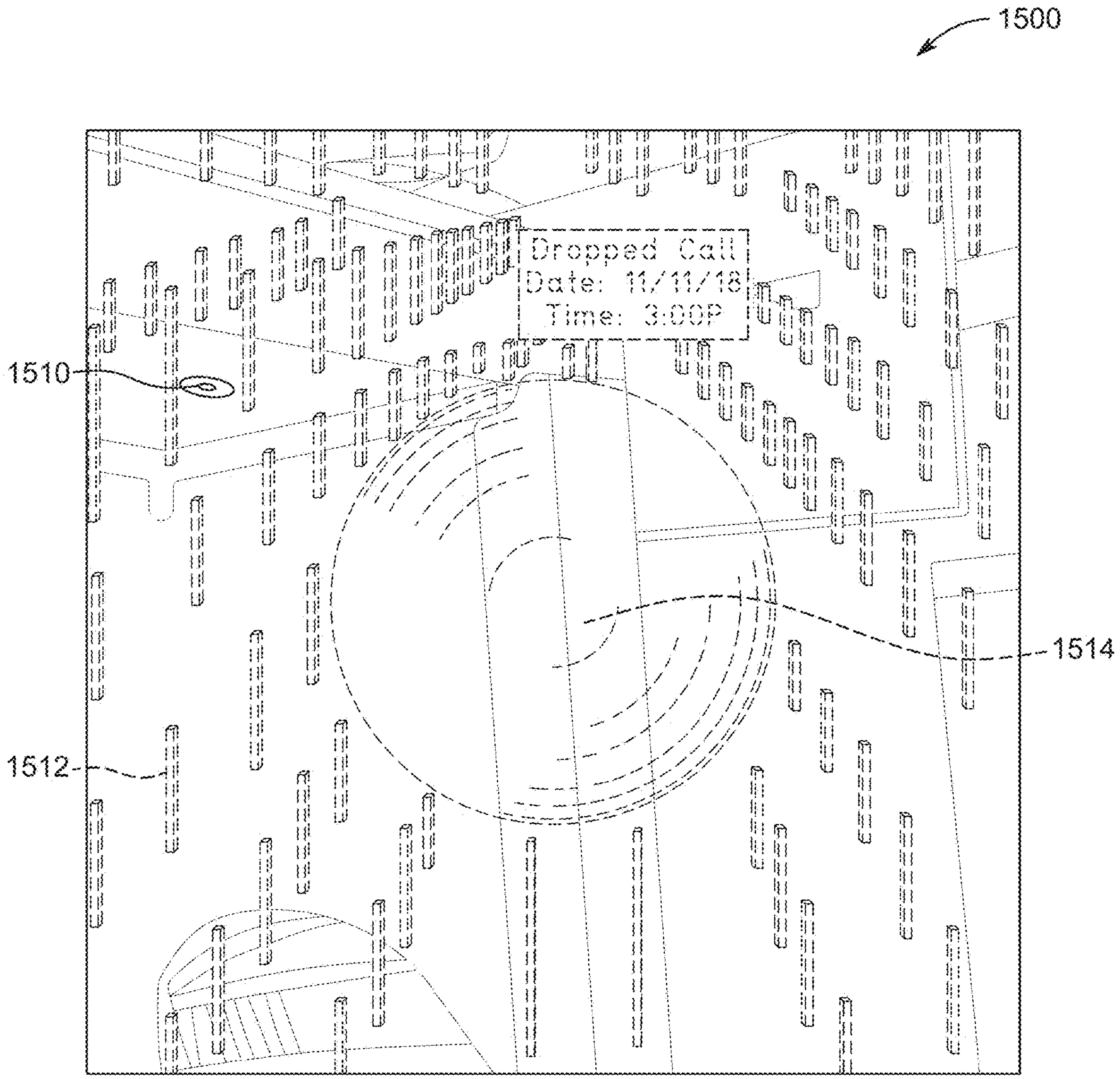
FIG. 15 shows a rendered three-dimensional spatialized image, according to one embodiment of the present arrangements and that depicts a "dead spot" (i.e., an area of "no connectivity") amidst a distribution of connectivity signal strength indicators within a particular real space of interest.

FIG. 15 shows a rendering of another environment 1500, according to another embodiment of the present teachings. In rendering 1500, presence of physical objects in the real world are shown with boundaries of solid lines and a magnitude of intangible properties inside the real space are shown with boundaries of dashed lines. Further, rendering 1500 shows virtual bars representing RSSI 1512 and an event history location 1514. Event history location 1514 includes information on cellular signal strength and dropped calls. This information may be collected from a user whenever a call is dropped by an application that allows for a user to detect a dropped call and send the information from the ground positioning component to a data store. The indicia representing the location of dropped calls may be spherical, as shown with a size proportional to the amount of calls dropped, and/or the time of a dropped call. In some embodiments of the present teachings, the indicia may be a graphical representation of the type of information being displayed. For example, and without limitation, the indicia may be an image of a cell phone. As a result, there are three layers of data, i.e., a first data layer dedicated to presenting physical objects present inside the real space, a second data layer dedicated to representing the distribution of one or more intangible properties (i.e., including its magnitude) inside the real space, and a third layer dedicated to providing and/or representing certain analytical information derived from the measurement of one or more of the intangible properties present inside the real space. Thus, the three layers of data allow a greater degree of visualization of the real space.

In one embodiment, programmable instructions of the present teachings, rely on complex data spatialization, sampling algorithms, and machine learning. When the different present methods describe herein are implemented as a software application, such applications discover signals emanating from nearby communication devices, which rely on radio waves for wireless connectivity, e.g., Wi Fi routers and Bluetooth devices. This information is preferably displayed back in a fully interactive, completely immersive overlay shown through a display of a present XR system, like a headset or smartphone.

The present teachings recognize that a distinction may be made between a signal collection device and a signal visualization device, even though they may be the same device in certain embodiments of the present teachings. A signal collection device, commonly called a sensor, is classified as one possessing a measurement device. In the context of radio frequency data, this would be a device containing an RF receiver and antenna operating on protocols like Wi Fi, Bluetooth, ZigBee, Z-Wave, 3G, 4G, LTE and 5G. A signal visualization device, on the other hand, is typically characterized by a display capable of showing objects mapped into real space. Visualization may include the use of holographic elements to create the perception of objects floating in front of the user, as in the case of AR headsets or smartphones. VR headsets may use simulated environments that allow remotely viewing a real space. Mixed Reality ("MR") and/or XR devices are typically a combination of both technologies, i.e., AR and VR, and allow for either type of experience.

Examples of devices that include both signal collection and signal visualization components include HoloLens available from Microsoft, Magic Leap One available from Magic Leap and smartphones like iPhone X available from Apple, Inc., and Galaxy S10 available from Samsung. Examples of devices that include only signal collection components include specialized RF antenna, microphone and Geiger counter. Examples of devices that include only signal visualization components include Meta 2 (i.e., an AR headset), Oculus Rift (i.e., VR headset) and HTC Vive (i.e., MR headset).

In one embodiment of the present arrangements, signal measurements are accomplished by mounting many kinds of sensors to the signal collection device and these sensors are discussed in connection with FIGS. 2 and 3 described herein.

The present teachings recognize that using sensor fusion and implicit directionality from the eyewear, triangulation of signals is possible. Further, by using headset-mounted or standalone microphones, advanced audio profiles may be built of the room that may model out sources of noise as well as noise propagation characteristics like the reverberation factor of the materials. The present teachings further recognize that using special high-pass and low-pass filters allows triangulation of certain types of equipment, like low-humming industrial generators, or high-pitched electrical transformers. Even in a typical home, devices like televisions, computers, and wireless routers emit distinct patterns of noise that is beyond the human ear's range but within the microphone's range. Such recognition allows the present teachings to accomplish audio fingerprinting. Representative devices used for audio fingerprinting include at least one device chosen from a group comprising thermometer, hygrometer, barometer and air flow sensor. In certain embodiments, the present teachings recognize that use of simple climate instruments allows measurement of and ultimately visualization of signals in 3D to accomplish such things as HVAC mapping, microclimate analysis, chemical tracing, insulation planning, and food storage auditing.

The sensors used in the present arrangement may be used to detect radiation, i.e., both thermal and infrared. To this end, examples of such sensors include Geiger counter and specific isotope detectors used in laboratories or nuclear plant settings.

In other embodiments, sensors in the present arrangements include those that detect certain harmful gases, e.g., carbon monoxide, methane and natural gas, and naturally occurring but not always easily detected harmful mold. In this context, the present teachings recognize that sensors that detect smoke may be useful when implementing method for informing regarding certain conditions. Smoke detecting sensors are useful for emergency scenarios like firefighting and industrial safety, or ventilation planning. Similarly, light detection sensors used in the present arrangement may be used in the form of a light meter to collect accurate color intensity and temperature values from the environment. This information may be useful to the film, lighting, and interior design industries to map out the reflectivity and general photographic atmosphere of the scanned scape.

In those instances, where vibratory information is deemed useful or necessary, sensors in the present arrangement are those that detect vibrations and seismic activity. For home automations application, the sensors of the present arrangement detect overlay location of home appliances, HVAC controls, light switches and power outlet. Further, based on image recognition of objects, manual entry, or triangulation of beacons, the present teachings are applied to accomplish Industrial Automation.

Regardless of whether the need is for automation, the present arrangements preferably include components that facilitate spatial data collection. To this end, the collection process preferably requires one or more users to take sensor signal measurements from various locations inside a space. More preferably, these sensor signal measurements are evenly distributed in the target space. By way of example, when the present teachings are implemented as a software application on a mobile device (e.g., eyewear or smartphone), sensor signal measurements may be automatically made while one or more users walk around the space. These users may either mount a sensor to the headset or AR- or XR-capable display, hold out a signal collection device within view of the headset or AR- or XR-capable display, or both.

Upon activating the signal collection mode, one or more of such users then follow onscreen instructions prompting them to walk around the area and scan it into the system. This may also be referred to as an active mode of operation. The information resulting from active mode of operation may be stored and/or processed in the cloud or on a local cluster of graphic processing units ("GPUs").

Before, during, or after the collection process, a calibration procedure may be invoked that requires collecting the location of certain type of sensors. By way of example, for calibration of a radio frequency (RF) antenna, a user may be instructed to precisely locate, within a room, a known signal emitter, such as a Wi Fi router, through a headset (e.g., AR or XR headset). The user may then be instructed to clockwise walk around the known signal emitter, keeping it at about an arm's length, and then be instructed to counterclockwise walk around the same emitter.

During this procedure, the visualizing system or spatializing subsystem collects hundreds or thousands of sensor data samples at certain locations in space, while visually tracking the emitter. The system then performs a mathematical analysis on the measurements and the precise location of those measurements to model and build a 3D representation of the sensor's signal measurements. By identifying the location of the emitter, the visualizing system or spatializing subsystem may lock onto the emitter's exact location and then measure variations in the sensor's signal measurement readings during the user's circular motion. Assuming a constant emitter output and that the emitter's signal output should remain relatively constant along a circular path around the emitter, any variations in signal collection may be attributed, with a higher degree of certainty, to the sensor's performance and dynamics.

Cellular antennas, for example, do not emit radiation in a perfectly spherical shape, but rather in multiple overlapping elliptical shapes that may very well not be symmetrical. In this case, the present teachings recognize that carrying a protective case around the signal collection equipment, or holding it in a certain way, may also alter the antenna's performance.

The present arrangements recognize that more than one antenna may be used during collection of sensor signal measurement. The collection process of the present teachings, in certain instances, supports multiple simultaneous users, given that they have a networked connection enabling the many users' applications (software embodying the present teachings and installed on a client device) to communicate. When operating in multi-user collection mode, the room is subdivided into partitions and each user is responsible for scanning their respective area, which falls within a particular partition. In the case that the two areas overlap, then the measurements from those overlapping areas may be used to improve calibration and accuracy because of the proximity of the sensor readings.

There are two modes of collection of sensor signal measurements, i.e., active mode of collection and passive mode of collection. In the active mode of collection, the user is shown a scanned outline of the space and visually directed (for example, by presenting arrows in the user's AR or XR headset) to walk to various points for taking sensor signal measurements. Feedback representing a measurement of the sensor signal are shown on the headset as collection from different areas within a space are completed. In the passive mode of collection, on the other hand, an application (software embodying the present teachings and installed on a client device) is capable of running as a background process, "listening" for sensor signals while the user is performing another task or even playing a game. Most such applications installed on spatial computing devices, such as AR or XR headsets, continuously utilize these sensor signal scanning features. In the passive mode of collection, while other tasks are being carried out in the foreground, the sensor signal scanning for collection purposes is taking place in the background for later processing. Regardless of whether the active mode of collection or the passive mode of collection is being implemented, the collection step or process collects not only signal measurement data, but the coordinates of the location where that signal measurement was obtained. This spatial data may be stored, in an encrypted format, if necessary, for security purposes, in a memory (for example, located on local device with database or log) from where it is later retrieved for processing. The spatial data may alternatively be stored on a remote server or using cloud-based synchronization. As yet another example, the present teachings may rely upon local caching of cloud data. The present teachings recognize that it is possible to retrieve existing room measurements, which originated from other users or public or private building plans, from cloud storage.

The signal measurement data and its corresponding location coordinates may be used to perform edge and cloud GPU signal analysis, interpolation between one or more sensor signal measurements, and extrapolation of sensor signal measurement data, using algorithms and calculations per signal type, to predict sensor signal values outside a space. In certain instances, the present arrangement includes employing dedicated hardware on-device for single pass filtering and live feedback, sync to cloud for supercomputer-class multi-pass filtering and far more advanced algorithmic processing. As mentioned above, cloud storage may also aggregate multiple users' sensor signal measurements to fill in the gaps. For processing sensor signal data, the present teachings may rely upon CPU-based raytracing or any traditional approach of raytracing. In one embodiment, the present teachings use multiple cores by distributing equal parts of a scene or space that is being perceived by the user's AR or VR headset. In an alternate embodiment, the present teachings use the relatively new techniques of GPU-based raytracing that perform raytracing like CPU's in the traditional approach. By way of example, when live GPU raytracing is implemented, the present teachings recognize that special GPU (repurposing game technology) may be implemented. To this end, Nvidia's RTX hardware, which includes built-in special raytracing instructions, works well. An application (software embodying the present teachings and installed on a client device) may translate the sensor signal measurements into a format the GPU is able to recognize and understand, so that the GPU is effectively fooled into thinking it is rendering a video game scene.

The present teachings may also rely upon mobile raytracing that will enable highly accurate results even when running on battery power in the field. During such a process, the present teachings may implement such steps as storing processed data, rendering of VR, AR or XR signals and/or providing feedback during the sensor signal measurement collection process.

In those instances, where the present teachings rely upon one or more users to walk around the room, the general shape of the sensor signal measured may be recorded and mapped into a spatial model by an underlying AR/VR/XR operating system of the present arrangements. This three-dimensional model or spatialized model may be made available to the system for building an approximate virtual representation of the room's layout and contents. This is electronically represented to the user as a "mesh," which is overlaid on top of the detected shapes. The present system may use a similar concept for showing mapped and unmapped areas during collection of sensor signal measurements. The present teachings recognize that when one or more people walk more of the different locations inside the space and collect attribute values more values for the different locations resulting the three-dimensional spatialized attribute value data of higher resolution, and this data is continuous updating as more people are walking to cover more area—in other words, the participants contribute to the higher resolution of the three-dimensional spatialized attribute value data).

In one aspect of the present teachings, unscanned, unmeshed areas are represented by dim, semi-transparent grids of dots/vertices that may protrude into as-yet-unmeshed elements of the room. In another aspect of the present teachings, unscanned, meshed areas are represented by dim, semi-transparent grids of dashes or connected lines that roughly approximate the shape of the room and its contents. In yet another aspect of the present teachings, scanned, meshed areas are shown with bold, colored vertical or horizontal lines with a brightness corresponding to the confidence of the signal measurements. In certain of these visual configurations, the present arrangements may display areas that have not been scanned, or display areas that have been scanned but are outdated, or have low confidence, or display areas that have not been scanned and may be interpolated or extrapolated, and as a result, do not need to be scanned.

In certain embodiments of the present teachings, a raw signal may be represented in the background or taking the form of "fog" and a processed signal may be represented in the background of or taking the form of "rain." When rendering the enhanced three-dimensional spatialized environment, the present teachings may show metadata like protocol versions, device addresses and frequencies. Other examples presented during rendering include displaying techniques for extreme-scale including instancing, point clouds, and frustum culling. In the context of a rendered enhanced three-dimensional spatialized environment, the present arrangements may allow for at least one of: interacting with a signal representation by a user; toggling between signal layers; using a graphical user interface to enable/disable multiple signal overlays; proximity-based control; activating whichever signal layers are the strongest or have the most accurate data; hand interaction for precise measurements in space; holding out hand to get extrapolated measurement at that exact point; touching the interactive signal in the form of "raindrops" to get detailed information; controlling time for historical analysis; performing transceiver activity overlay; displaying emitters; animating 3D icons are placed at the location of detected transmitters; displaying sensors and signal collectors, displaying signals passing between devices; animating lines of various styles including dotted and dashed are drawn between transmitters and receivers; and/or displaying the direction and general path of that signal through the air. In the case that the present system detects physical barriers and signal reflections, the lines shown will follow the model to create the most accurate display. By way of example, line segments use a combination of color, size, and frequency of animation to indicate the magnitude of signal activity such as bandwidth or latency of network communication.

In those embodiments when the present teachings rely upon a multi-user operation, fusion of sensor signal measurements obtained from multiple signal collectors on multiple users is performed. When merging or fusing sensor signal measurements obtained from multiple signal collectors, the present teachings preferably use sensor proximity as a factor in merging of fusing the sensor measurement readings into the collection process. To this end, the above-mentioned location calibration process facilitates accurately fusing sensor measurement data. By way of example, fusing or merging, according to the present teachings, relies upon a process that is similar that performed by differential GPS system, which uses known points for performing certain corrections. The present teaching, when implementing fusing or merging, may also use AI/ML for transceiver placement and room-scale optimization. In other embodiments, the present teachings may carry out macro-scale aggregation for carrier-level optimization to accomplish fusing or merging as described herein.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly, and in a manner consistent with the scope of the invention, as set forth in the following claims.

What is claimed is:

1. A method for rendering two different types of datasets, said method comprising:

obtaining, using one or more optical sensors, a first type of dataset, wherein each first data value within said first type of dataset is associated with one or more three-dimensional location coordinates, which define a location or region in real space;

obtaining, using one or more non-optical sensors, a second type of dataset, wherein each second data value within said second type of dataset is associated with one or more of said three-dimensional coordinates, wherein type of data in said second type of dataset is different from said first type of dataset, and wherein said second type of dataset represents an intangible property of said real space;

spatializing, using a plurality of said three-dimensional location coordinates, said first type of dataset to create a first type of spatialized dataset;

spatializing, using said plurality of said three-dimensional location coordinates, said second type of dataset to create a second type of spatialized dataset;

aligning said first type of spatialized dataset with said second type of spatialized dataset to create an enhanced three-dimensional spatialized environment; and rendering, using a rendering engine and on a display component, said enhanced three-dimensional spatialized environment.

2. The method for rendering two different types of datasets of claim 1, wherein said obtaining said first type of dataset is carried out using a ground positioning component and a first optical sensor of said one or more optical sensors and/or a first database, wherein said ground positioning component and said first optical sensor being disposed on an eyewear and said first database residing inside or communicatively coupled to said eyewear.

3. The method for rendering two different types of datasets of claim 2, wherein said obtaining a second type of dataset is carried out using a first non-optical sensor of one or more non-optical sensors and/or a second database, and wherein said first non-optical sensor being disposed on at least one of said eyewear or on an external device that is external to said eyewear, and said second database residing inside or communicatively coupled to said eyewear.

4. The method for rendering two different types of datasets of claim 1, wherein said spatializing said first type of dataset is carried out using an image spatializing module residing on an eyewear or on an external processor that is external to said eyewear, wherein said external processor being communicatively coupled to said eyewear, and said method further comprising:

spatially partitioning, using said image spatializing module, said real space into a plurality of subdivisions, wherein said space being defined using said plurality of three-dimensional location coordinates; and integrating said plurality of subdivisions to create a spatialized model of said real space, wherein said first data values being distributed, based upon said spatialized model, to create said first type of spatialized dataset.

5. The method for rendering two different types of datasets of claim 1, wherein said spatializing said second type of dataset is carried out using an attribute spatializing module residing on an eyewear or on an external processor disposed external to said eyewear, wherein said external processor being communicatively coupled to said eyewear, and said method further comprising:

spatially partitioning, using said attribute spatializing module, said real space into a plurality of discrete subdivisions, wherein said space being defined using said plurality of three-dimensional location coordinates; and integrating said discrete subdivisions to create a spatialized model of said real space, wherein said second data values being distributed, based upon said spatialized model, to create said second type of spatialized dataset.

6. The method for rendering two different types of datasets of claim 1, wherein said aligning said first type of spatialized dataset with said second type of spatialized dataset is carried out using an aligning module residing on an eyewear or on an external processor disposed external to said eyewear, and wherein said external processor being communicatively coupled to said eyewear.

7. The method for rendering two different types of datasets of claim 1, wherein said aligning includes using one or more common spatial features present in said first type of spatialized dataset and said second type of spatialized dataset to create said enhanced three-dimensional spatialized environment.

8. The method for rendering two different types of datasets of claim 1, wherein in said rendering, said rendering engine residing on an eyewear or on an external processor disposed external to said eyewear, and wherein said external processor being communicatively coupled to said eyewear.

9. The method for rendering two different types of datasets of claim 1, wherein said display component being integrated into a client device, which is at least one device chosen from a group comprising eyewear, smartphone, and computer.

10. A method for rendering an attribute value dataset and an image dataset, said method comprising:

obtaining, using an optical sensor, three-dimensional pixelated data values or three-dimensional voxelated data values for one or more corresponding three-dimensional location coordinates, wherein each of said corresponding three-dimensional location coordinates being associated with at least one associated three-dimensional pixelated data values or at least one associated three-dimensional voxelated data values;

obtaining, using at least one non-optical sensor, one or more different types of attribute values for one or more of said corresponding three-dimensional location coordinates, wherein each of said corresponding three-dimensional location coordinates being associated with attribute values of at least one type;

spatializing, using a plurality of said corresponding three-dimensional location coordinates, said associated three-dimensional pixelated data values or said associated three-dimensional voxelated data values to create a spatialized image dataset;

spatializing, using said plurality of said corresponding three-dimensional location coordinates, said associated attribute values of at least said type to create a spatialized attribute value dataset of at least said type;

aligning said spatialized image dataset with said spatialized attribute value dataset to create an enhanced three-dimensional spatialized environment; and rendering, using a rendering engine and on a display component, said enhanced three-dimensional spatialized environment.

11. The method for rendering said attribute value dataset and said image dataset of claim 10, wherein said spatializing step to create said spatialized image dataset and/or said spatializing to create said spatialized attribute value dataset includes:

spatially partitioning a space into a plurality of subdivisions, wherein said space being defined using said corresponding three-dimensional location coordinates; and integrating said subdivisions to create a spatialized model for said space.

12. The method for rendering said attribute value dataset and said image dataset of claim 10, further comprising storing one or more different types of said associated attribute values and said corresponding three-dimensional coordinates into a database.

13. The method for rendering said attribute value dataset and said image dataset of claim 10, wherein using at least one said non-optical sensor includes using multiple non-optical sensors installed on different client devices that includes a smartphone or a wearable.

14. The method for rendering said attribute value dataset and said image dataset of claim 13, wherein said obtaining one or more different types of attribute values includes obtaining said attribute values of at least one type at said plurality of said corresponding three-dimensional location coordinates, such that each of said corresponding three-dimensional location coordinates being associated with attribute values of at least one said type.

15. The method for rendering said attribute value dataset and said image dataset of claim 10, wherein said aligning being implemented, using a processor, based upon one or more common vertices present in spatialized image dataset and in spatialized attribute value dataset, and located inside a real space being defined by said plurality of said corresponding three-dimensional location coordinates.

16. The method for rendering said attribute value dataset and said image dataset of claim 10, wherein said rendering includes:

representing said associated attribute values of a particular type obtained at a location inside a real space with virtual objects;

comparing said associated attribute values of said particular type to a threshold attribute value of said particular type;

assigning said virtual objects a first color, if said associated attribute values of said particular type is greater than said threshold attribute value of said particular type;

assigning said virtual objects a second color, if said associated attribute values of said particular type is less than said threshold attribute value of said particular type, and wherein said second color is different from said first color; and rendering said virtual objects at objects rendering locations, in said enhanced three-dimensional spatialized environment, that correspond to locations of said corresponding three-dimensional location coordinates that are associated with said associated attribute values of said particular type.

17. The method for rendering said attribute value dataset and said image dataset of claim 16, wherein said spatializing to create said spatialized attribute value dataset includes interpolating, using two or more of said associated attribute values of said particular type and two or more of said corresponding three-dimensional location coordinates, to compute an intermediate associated attribute value of said particular type, and wherein a corresponding intermediate three-dimensional location coordinate, disposed between two or more of said corresponding three-dimensional location coordinates, being associated with said intermediate associated attribute value of said particular type.

18. The method for rendering said attribute value dataset and said image dataset of claim 17, further comprising rendering an intermediate virtual object at an intermediate object location, in said enhanced three-dimensional spatialized environment, that corresponds to a location of said corresponding intermediate three-dimensional location coordinate associated with said intermediate associated attribute value of said particular type.

19. The method for rendering said attribute value dataset and said image dataset of claim 16, wherein said spatializing to create said spatialized attribute value dataset includes extrapolating, using two or more of said associated attribute values of a particular type and two or more of said corresponding three-dimensional location coordinates, to compute a predicted associated attribute value of said particular type, wherein a corresponding exterior three-dimensional location coordinate, disposed outside of said real space and positioned on a linear trajectory that intersects two or more of said corresponding three-dimensional location coordinates, being associated with said predicted associated attribute value of said particular type, and wherein said real space being defined using said plurality of said corresponding three-dimensional location coordinates.

20. The method for rendering said attribute value dataset and said image dataset of claim 19, in said rendering, further comprising rendering exterior virtual objects at exterior object locations, in said enhanced three-dimensional spatialized environment, corresponding to locations of said corresponding exterior three-dimensional location coordinate associated with said predicted associated attribute values of said particular type.

* * * * *